(12) United States Patent
Bell

(10) Patent No.: US 11,961,390 B1
(45) Date of Patent: *Apr. 16, 2024

(54) CONFIGURING A SECONDARY DEVICE

(71) Applicant: Amazon Technologies, Inc., Seattle, WA (US)

(72) Inventor: Joseph Bell, Lakewood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

This patent is subject to a terminal disclaimer.

(21) Appl. No.: 17/062,285

(22) Filed: Oct. 2, 2020

Related U.S. Application Data

(63) Continuation of application No. 16/019,030, filed on Jun. 26, 2018, now Pat. No. 10,796,563.

(51) Int. Cl.
| | |
|---|---|
| *G10L 15/22* | (2006.01) |
| *G04C 11/00* | (2006.01) |
| *G08C 17/02* | (2006.01) |
| *H04W 4/02* | (2018.01) |

(52) U.S. Cl.
CPC ............ *G08C 17/02* (2013.01); *G04C 11/02* (2013.01); *G10L 15/22* (2013.01); *H04W 4/023* (2013.01); *G08C 2201/31* (2013.01); *G10L 2015/223* (2013.01)

(58) Field of Classification Search
USPC .................... 704/246, 247, 251, 252, 275
See application file for complete search history.

(56) References Cited

U.S. PATENT DOCUMENTS

| | | | |
|---|---|---|---|
| 2006/0282649 A1 | 12/2006 | Malamud et al. | |
| 2011/0258689 A1 | 10/2011 | Cohen et al. | |
| 2014/0335789 A1 | 11/2014 | Cohen et al. | |
| 2015/0349848 A1* | 12/2015 | Yang ................... | H04B 5/0031 455/41.1 |
| 2017/0132613 A1 | 5/2017 | Tunnell et al. | |
| 2017/0230753 A1* | 8/2017 | Friedlander ............. | H04R 5/04 |
| 2018/0181928 A1 | 6/2018 | Woo | |
| 2018/0335903 A1* | 11/2018 | Coffman ............ | G06F 3/04847 |
| 2019/0060733 A1* | 2/2019 | Benson .................. | A63B 69/36 |

OTHER PUBLICATIONS

Non Final Office Action dated Mar. 4, 2020 for U.S. Appl. No. 16/019,030 "Configuring a Secondary Device", Bell, 10 pages.

* cited by examiner

*Primary Examiner* — Leonard Saint-Cyr
(74) *Attorney, Agent, or Firm* — Lee & Hayes P.C.

(57) ABSTRACT

This disclosure describes systems and methods for using a primary device, communicatively coupled to a remote system, to configure or re-configure a secondary device in the same environment as the primary device. In some instances, the primary device may communicatively couple to the secondary device via a short-range wireless connection and to the remote system via a wireless area network (WAN), a wired connection, or the like. Thus, the primary device may act as an intermediary between the secondary device and the remote system for configuring the secondary device.

20 Claims, 13 Drawing Sheets

SECONDARY DEVICE
104(1)

PRIMARY DEVICE
102

REMOTE SYSTEM
118

SECONDARY DEVICE
104(1)

PRIMARY DEVICE
102

REMOTE SYSTEM
118

SECONDARY DEVICE
104(1)

PRIMARY DEVICE
102

REMOTE SYSTEM
118

CONFIGURING A SECONDARY DEVICE

RELATED APPLICATIONS

This application claims priority to and is a continuation of U.S. patent application Ser. No. 16/019,030, filed on Jun. 26, 2018, the entire contents of which are incorporated herein by reference.

BACKGROUND

As smart devices continue to proliferate, users continue to introduce new types of devices to their homes, offices, and other environments. While these new devices bring added functionality to these different environment, configuring these devices during the out-of-box experience (OOBE) or at other times may prove difficult for some users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
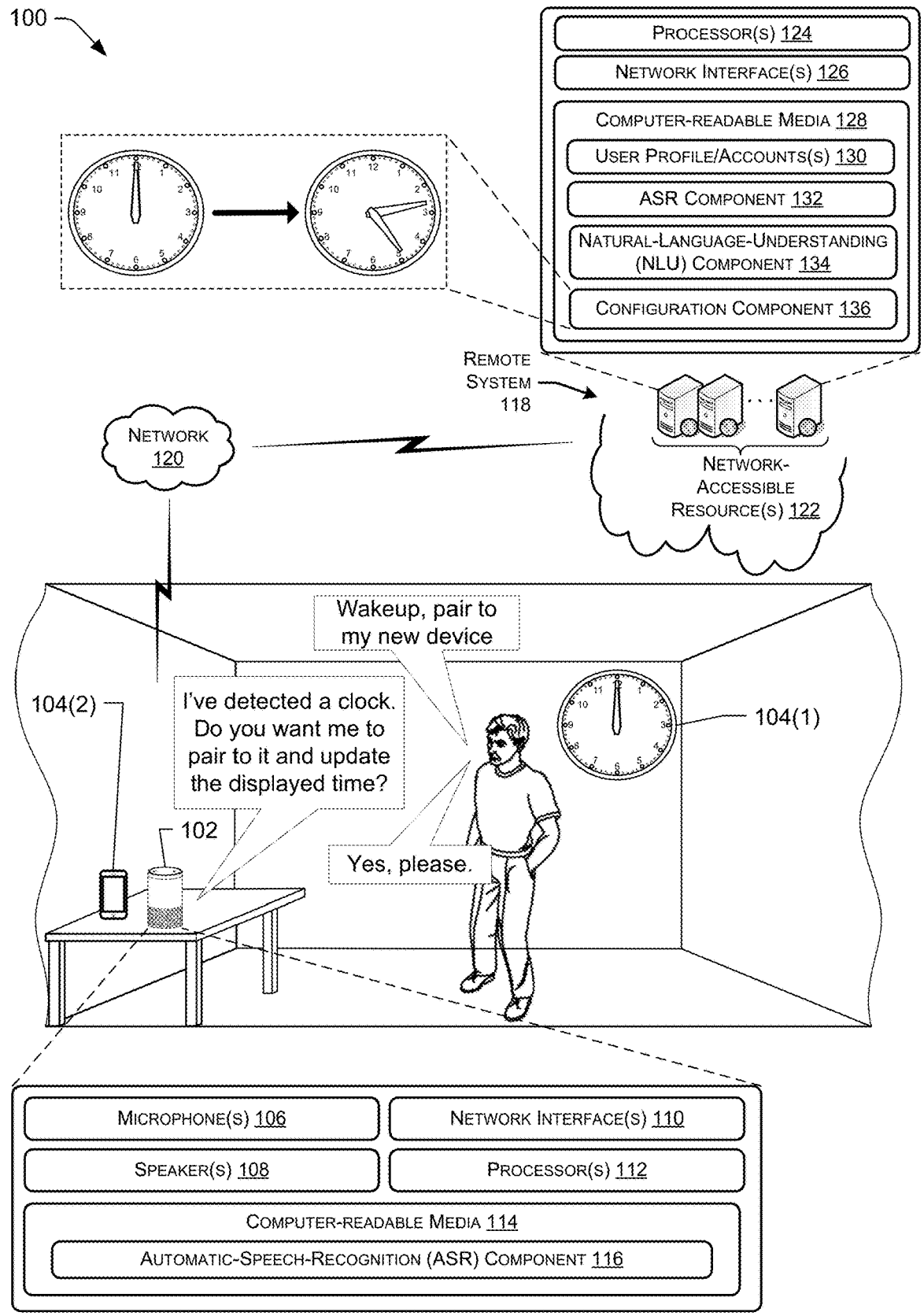
FIG. 1 illustrates a schematic diagram of an example environment that includes a secondary device and a primary device that may, in combination with a remote system, configure a secondary device by, for example, causing a physical member of the secondary device to move from an initial position to an updated position. For example, the primary device may couple to a smart analog clock and the primary device may cause a timer hand of the clock to move from an initial position to an updated position corresponding to a current time at the environment.

This disclosure describes, in part, systems and methods for using a primary device, communicatively coupled to a remote system, to configure or re-configure a secondary device in the same environment as the primary device. In some instances, the primary device may communicatively couple to the secondary device via a short-range wireless connection and to the remote system via a wireless area network (WAN), a wired connection, or the like. Thus, the primary device may act as an intermediary between the secondary device and the remote system for configuring the secondary device.

In some instances, the secondary device may comprise one or more movable physical members that are adjustable to varying positions. For instance, a smart analog clock may include one or more clock hands that are adjustable to varying positions to represent different times of the day. In another example, an animatronic toy may include arms or legs that move to different positions, accessories (e.g., sunglasses) that move to different positions, and/or the like. Of course, while a few example secondary devices are described, it is to be appreciated that the techniques may apply to any secondary device that includes one or more movable physical members.

In some instances, the secondary device is to be configured upon being first powered on and/or communicatively coupled to the primary device and, thus, the remote system. For example, when a user first powers on a smart analog clock, the clock hands may be positioned in a default manner that does not reflect the current time. Thus, the smart clock may be configured, using the described techniques, to reflect the current time. In addition, or in the alternative, when a time change occurs in the environment of the smart clock (e.g., from standard time to daylight savings time, or vice versa), the smart clock may be configured via the primary device and/or the remote system to reflect the updated, correct time.

In another example, sunglasses or arms of an animatronic toy may be positioned at an initial default position but, upon being powered on and/or coupled to the primary device and/or remote system, may be configured to a new, desired position. For instance, if the sunglasses are down, covering eyes of the animatronic toy, upon powering on and/or coupling (e.g., pairing) the toy to the primary device the sunglasses may be moved to a position atop a head of the toy as part of the out-of-box experience (OOBE) of the user. Again, while a few example scenarios are described, it is to be appreciated that the techniques may apply to an array of other scenarios involving an array of secondary devices.

In one example, a smart analog clock may be updated to reflect the current time upon being powered on and coupling to a primary device, such as a voice-controlled device, a mobile phone, a smart television, and/or the like. For instance, a user may first power on the smart analog clock and may proceed to issue a request to a primary device to couple (e.g., pair) the primary device to the smart analog clock. In the example of the mobile phone or other device that includes a display and/or additional physical input/output devices, the user may operate a graphical user interface (GUI) executed by a software application on the primary device to make the request. In the example of a voice-controlled device, the user may issue a voice command to the device, such as "pair to my smart analog clock" or the like. In each instance, the primary device may receive the request and send the request over a network to a remote system.

In the example of the voice-controlled device, the voice-controlled device may first send an audio signal that represents the voice command to the remote system. The remote system may then perform automated speech recognition (ASR) on the audio signal to generate text corresponding to the request. After generating the text (e.g., "pair to my smart analog clock"), the remote system may analyze the text using natural-language understanding (NLU) to determine an intent associated with the request. In this example, an NLU component may route the request to a configuration component responsible for causing a device, such as the primary device, to pair with another device, such as the smart analog clock. In this example, the configuration component may generate an instruction to cause the voice-controlled device (or other primary device) to attempt to detect pairable devices in the environment. The configuration component may then send this instruction to the voice-controlled device.

The voice-controlled device may then receive and execute the instruction from the configuration component. In some instances, the instruction may cause the voice-controlled device to power on its onboard short-range wireless communication (e.g., Bluetooth, ZigBee, etc.) chip and attempt to detect pairable devices. In other instances, the instruction may cause the voice-controlled device to attempt to detect a device over protocols other than Bluetooth, ZigBee, or the like, such as over WiFi or the like. In either instance, given that the user has powered on the smart analog clock, the voice-controlled device may detect the presence of the smart analog clock. In addition, the smart analog clock may have provided identification data identifying the clock to the voice-controlled device. In response to detecting the clock, the voice-controlled device may output audio, such as "I've detected a clock. Do you want me to pair to it and update the displayed time?" In some instances, the In configuration component may have utilized a text-to-speech (TTS) component at the remote system to generate audio data corresponding to this output audio data and may have sent this audio data to the voice-controlled device along with the instruction to attempt to detect the smart analog clock. In other instances, upon detecting the clock, the voice-controlled device may have sent an indication back to the configuration component, which may have generated and sent the audio data to the voice-controlled device in response.

In either instance, after outputting the audio, the voice-controlled device may generate another audio signal based on sound captured by one or more microphones of the device and may send this audio signal to the remote system. The voice-controlled device may also provide the identification data identifying the clock back to the remote system. The remote system may perform ASR and/or NLU techniques on the audio signal to generate text data and/or intent data and may provide this text data and/or intent data, along with the identification data, back to the configuration component. If, for example, the user says "yes" in response to the query outputted on the speaker(s) of the voice-controlled device, then the configuration component may generate an instruction to cause the voice-controlled device to pair to the smart analog clock (or other secondary device). If the user says "no", then the configuration component may refrain from generating and/or sending this instruction to the voice-controlled device.

In this example, envision that the user says "yes" and, in response, the configuration component sends an instruction to the voice-controlled device to pair to the smart analog clock. In addition, the configuration component may determine how to configure the newly detected clock. For example, the configuration component may determine whether the identified clock has previously been coupled to the voice-controlled device and/or to any other primary devices. If not, then the configuration component may determine a default position of the clock hands of the clock. For example, each new smart clock may initially be provided to users with the clock hands at 12:00 or at some other default time known to the configuration component of the remote system.

In addition to determining a current position of the clock hand(s) of the clock, the configuration component may determine an updated position of the clock hand(s) corresponding to the current time or a time in the very near future. For example, the voice-controlled device, in communicating with the remote system, may provide its own identification data identifying itself, which the configuration component and/or another component of the remote system may use to identify a current time at the environment of the clock and the voice-controlled device. The configuration component may thus determine a current time at the environment and may use this information to determine an updated position of the clock hands. For instance, if the current time in the environment is 3:00 pm, then the configuration component may determine that the clock hand(s) of the clock should be moved from the current position (12:00) to a time at or near the new position (3:00).

In some instances, the smart analog clock may include a motor that is used to drive one or more gears that, in turn, translate into movement of the hand(s) of the clock. For example, the smart analog clock may be configured with a motor and a microcontroller that drives a 30 ms pulse (or pulse of another duration) every second to cause the second hand of the clock to move 1 second forward, the minute hand to move $\frac{1}{60}^{th}$ of a minute and the hour hand to move $\frac{1}{3600}^{th}$ of an hour. The configuration component may use the identification data identifying the clock to determine, by reading from a database storing information associated with the clock, this pulse rate of the microcontroller of the clock. The configuration component may then calculate how may consecutive pulses to instruct the microcontroller to emit to cause the clock hands to reach the desired position of 3:00. For example, given the example pulse rate of 30 ms, the configuration component may calculate that the microcontroller would need to emit 10,800 pulses (180 minutes×60 seconds) to cause the clock hands to move from 12:00 to 3:00. Given the pulse length, the configuration component may calculate that it would take 324 seconds (30 ms×10, 800) to emit the 10,800 pulses, at which point the current time would be 3:05:24. Therefore, the configuration component may calculate that the microcontroller is to emit another 324 pulses, which itself would take the clock 9.72 seconds. Thus, the configuration component may calculate that the microcontroller is to emit another 10 pulses (taking 0.3 seconds) to account for this time. In sum, in this example the configuration component may calculate that the microcontroller is to emit 11,134 pulses (10,800+324+10) to cause the motor to drive the clock hand(s) to the updated position representing the current time. Of course, in some instances the calculation of the configuration component may also take into account factors such as network latency, and the like. In any event, after the calculation the configuration component may send the instruction to pair to the clock and the calculated configuration data (e.g., the number of pulses that the microcontroller is to emit) to the voice-controlled device. Of course, in other instances the configuration component may first send the instruction to pair and, upon receiving an indication of a successful pair from the voice-controlled device, may calculate the configuration data and send the configuration data to the voice-controlled device.

In this example, in response to receiving the instructions, the voice-controlled device may pair to the smart analog clock, such as over Bluetooth, ZigBee, or the like. The voice-controlled device may then send, to the smart analog clock, the instruction to cause the microcontroller to emit the calculated number of pulses to cause the clock hand(s) to move to the updated position corresponding to the current time. In response to receiving this instruction, the smart analog clock may execute the instruction, causing the microcontroller to emit the instructed number of pulses to move the motor to move the hand(s) to the desired position(s). Upon completion, the smart analog clock may send, to the voice-controlled device, an indication that the instruction has been successfully executed to the voice-controlled device, which may relay this information back to the remote system.

While the above example describes using voice to configure the secondary device, in other instances a user may use any other type of input on any type of primary device. For example, a mobile phone, tablet, or other device may render a graphical user interface (GUI) illustrating the movable members, such as the clock hands, and the user may provide input via the GUI to move the members to the desired position (e.g., the current time, five minutes ahead, etc.). Again, however, any other type of user input may be utilized to configure the secondary device.

In still other instances, one or more additional secondary devices in the environment may be used to determine how to configure the new secondary device, such as the smart analog clock newly introduced into the environment. For example, upon identifying the new analog clock, the voice-controlled device or other primary device may determine whether the environment includes another smart analog clock or other smart secondary device depicting a current time. If so, the primary device may determine the current time indicated by this additional secondary device and may use this information in configuring the new smart clock, given that it may indicate a preference of the user. For example, if the additional smart analog clock is five minutes fast, the primary device may provide this information to the configuration component, which may generate configuration data that also causes the newly introduced analog clock to illustrate a time that is five minutes fast. In still other instances, the primary device may use this additional information to alter the instruction received from the configuration component and/or generate an additional instruction for sending to the secondary device. For instance, continuing the example from above, if the instruction from the configuration component indicates that the microcontroller of the smart analog clock is emit 11,134 pulses to move the clock hand(s) from 12:00 to 3:00, and that another clock in the environment indicates that it is five minutes ahead, then the primary device may determine additional pulses to cause the microcontroller of the new clock to emit to result in the new clock also being five minutes fast. For example, a configuration component on the primary device may calculate that the microcontroller is to emit an additional 300 pulses (5 minutes×60 seconds) to cause the new clock to be set as five minutes fast. In addition, given the example pulse length of 30 ms, the configuration component on the primary device may calculate that it will take 9 seconds (30 ms×300) to emit the additional 300 pulses, at which point the clock would be 4 minutes and 51 seconds ahead of the real time (5 minutes less the additional 9 seconds it took to move the clock hand(s) ahead 5 minutes). Therefore, the configuration component may calculate that the microcontroller is to emit another 9 pulses, which itself would take the clock 0.27 seconds. Thus, the configuration component may calculate that the microcontroller is to emit an additional 309 pulses (300+9) to cause the clock to be five minutes ahead. In some instances, the configuration component on the primary may alter the initial instruction prior to sending it to the secondary device to indicate that the microcontroller is to emit 11,443 pulses (11,134+309) or may generate and send an additional instruction to cause the microcontroller to emit 309 pulses in addition to the 11,134. Of course, while this example describes a local instance of a configuration component altering or supplementing the calculations performed at the remote system, in other instances the configuration component of the remote system may perform this calculation in response to determining (from a local user device, a user profile at the remote system, etc.) that the user prefers to keep her clocks five minutes ahead of the current time.

Furthermore, while the above example describes one manner in which the configuration component may generate the configuration data, it may do ways other than calculating a number of pulses to be emitted by a microcontroller. Further, while the above example also describes one example manner in which a secondary device may move its movable member(s), other secondary devices may include other means for doing so.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims. Additional details are described below with reference to several example embodiments.

FIG. 1 illustrates a schematic diagram of an example environment 100 that includes a primary device 102 and a secondary device 104(1). The primary device 102 may be, for example, a voice-controlled device that may capture user utterances and perform one or more actions based at least in part on those user utterances. In other instances, the primary device 102 may comprise a mobile phone, a tablet computing device, a desktop computing device, and/or any other type of computing device. The secondary device 104(1) may be, for example, a clock, an animatronic toy, a display device, and/or any type of computing device. In some instances, the secondary device 104(1) may comprise a clock, such as a wall clock, a physical timer, such as an egg timer, a device having a digital display, and/or one or more devices capable of presenting the tracking of time and/or the passage of time. The secondary device 104(1) will be described as a smart analog clock with respect to FIG. 1, but it should be understood that this embodiment of the secondary device 104(1) is provided herein for illustration and not as a limitation.

In some instances, the secondary device 104(1) may be situated in an environment in which the device 102 is situated. The environment 100 may additionally, or alternatively, include an additional device 104(2), such as a mobile phone, another smart analog clock, or the like. In some instances, the additional device 104(2) may be used, in addition or in the alternative to the primary device 102, to configure and/or interact with the secondary device 104(1). Additionally or alternatively, the additional device 104(2) may be used by the primary device 102 or a remote system, described below, for determining how to configure the secondary device 104(1). As used herein, the term "environment" means a given area. Non-limiting examples of environments may be, for example, a room, a house, an office, a place of business, an apartment, and/or an outdoor space.

The device 102 may include components such as, for example, one or more microphones 106, one or more speakers 108, one or more network interfaces 110, one or more processors 112, one or more computer-readable media 114. The computer-readable media 114 of the device 102 may include an automatic-speech-recognition (ASR) component 116, which may be configured to identify one or more predefined utterances (e.g., words or phrases), known as "wakewords", that when identified cause the device 102 to begin sending generated audio signals to a remote system 118 over a network 120. The remote system 118 may comprise one or more network-accessible resources 122 and may include components discussed below. The device 102, meanwhile, may include all or some of the components described herein or only a portion of the illustrated components. The additional device 104(2) may include the same or similar components as the device 102 and may be perform the same or similar functions as the device 102, in examples. In examples, the additional device 104(2) may perform functions of the device 102 instead of or in addition to the device 102.

The secondary device 104(1), described in further detail with reference to FIG. 5, may include components such as processors, network interfaces, clock components (e.g., a motor, a microcontroller to drive the motor, movable clock hands, etc.), memory, light elements, and/or the like. The clock components may include, for example, a minute hand, an hour hand, a second hand, numerical indicators of hours, such as the numbers 1-12, indicators of minutes and/or seconds, such as demarcations between the hour indicators, and/or components that move the minute hand, the hour hand, and/or the second hand in a manner that corresponds with the passage of time. Additionally, or alternatively, the clock components may include one or more moveable members configured to be physically moved, such as by a user, a motor, and/or the like. For example, the moveable member may be a dial that may be rotated to set a timer. Additionally or alternatively, the moveable member(s) may comprise one or more clock hands that may be set by a motor driven by a microcontroller or other logic residing on the clock.

Additionally, or alternatively, the clock components may include a display configured to present a visual indication of time. Additionally, or alternatively, the clock components may include a clock face, also described as a dial, an hour hand, a second hand, a minute hand, one or more gears, also described as wheels, positioned to remote the hour hand, the second hand, and/or the minute hand, and means to rote the gears such as an electronic motor and/or a weight-and-pendulum system.

The device 102 may be configured to communicate with the secondary device 104(1) via one or more short-range communication means, such as Bluetooth, Bluetooth Low Energy (BLE), Bluetooth Smart, ZigBee, and/or the like. When paired, communication between the device 102 and the secondary device 104(1) may be continuous and/or near continuous such that data is sent and/or received between the device 102 and the secondary device 104(1) continuously and/or nearly continuously. Alternatively, communication between the device 102 and the secondary device 104(1) may be periodic such that data is sent and/or received between the device 102 and the secondary device 104(1) on a periodic basis, such as every second, every fraction of a second, and/or every minute. As described below, the device 102 may initially configure the clock hands of the secondary device 104(1) upon initially detecting the device 104(1) and/or upon other triggering events, such as the beginning or ending of daylight savings time or the like.

Additionally, the environment 100 may include the remote system 118 configured to communicatively couple over the network 120 to the primary device 102 (and potentially other devices in the environment. The remote system 118 may comprise one or more network-accessible resources 122 (e.g., server computing devices), which may include components such as, for example, one or more processors 124, one or more network interfaces 126, and one or more computer-readable media 128. The components of the computer-readable media 128 may include, for example, a user profile/account component 130, an ASR component 132, a natural-language-understanding (NLU) component 134, and a device-configuration component 136.

The user profiles/accounts component 130 may be configured to identify, determine, and/or generate associations between users, user profiles, user accounts, and/or devices. For example, one or more associations between the devices shown in FIG. 1, environments, networks, users, user profiles, and/or user accounts may be identified, determined, and/or generated by the user profile/account components 130. The user profile/account component 130 may additionally store information used to configure devices, such as a location of the environment 100, which may be used to determine a time of a day, weather, or the like. It should also be understood that that a user account may be associated with one or more than one user profiles. For example, a given additional device 104(2), device 102, and/or secondary device 104(1) may be associated with a user account and/or user profile that is also associated with the devices associated with an environment. The additional device 104(2), the device 102, the secondary device 104(1), the user profile, and/or the user account may be associated with one or more applications, which may have their own user profiles and/or user accounts.

The ASR component 132 may be configured to receive audio data, which may represent human speech such as user utterances, and generate text data corresponding to the audio data. The text data may include words corresponding to the human speech. The NLU component 134 be configured to determine one or more intents associated with the human speech based at least in part on the text data. The ASR component 132 and the NLU component 134 are described in more detail below with respect to FIG. 6. The device-configuration component 136, meanwhile, may generate and provide configuration data for secondary devices, such as the secondary device 104(1) as described below.

In the example of FIG. 1, the primary device 102 may take the form of a voice-controlled device, through which the illustrated user may begin the configuration process of the secondary device 104(1). As illustrated, the user may state the following utterance: "Wakeup, pair to my new device." The microphones 106 of the device 102 may generate an audio data based on captured sound and the ASR component 116 may analyze the audio data to identify a predefined utterance, such as "wakeup" in this example. In response to identifying this utterance, the device 102 may begin sending the audio data over the network 120 to the remote system 118.

Upon receiving the audio data, the ASR component 132 may generate text data corresponding to the voice command of the user and may provide this text data to the NLU component 134. The NLU component 134 may generate intent data indicating an intent of the user associated with the command and may route the request to the appropriate component of the remote system based on the intent data. In this example, the NLU component 134 may determine to route the request to the configuration component 136.

The configuration component 136 may be programmed to determine how to configure the secondary device 104(1) upon a particular trigger event, such as the secondary device 104(1) being powered on (e.g., for a first time, for a first time in a particular environment, etc.), after a time change at the environment, and/or after any other trigger event. In some instances, the configuration component 136 may generate one or more instructions that cause one or more physical members of the secondary device 104(1) to move from a first position (e.g., a default position) to a second position. The configuration component 136 may send this instruction(s) to the primary device 102 for routing to the secondary device 104(1), to an additional device 104(2) for routing to the secondary device 104(1), and/or directly to the secondary device 104(1).

In some instances, a user may interact with the primary device 102 for configuring the secondary device 104(1). In the illustrated example, for instance, the user states the following: "Wakeup, pair to my new device." In this example, the primary device is embodied as a voice-controlled device and, thus, generates an audio signal based on sound captured by the microphone(s) 106. In addition, the ASR component 116 of the primary device 102 may be configured to analyze the audio signal to identify a predefined utterance (e.g., a "wakeword"). In this example, the predefined utterance may comprise the word "wakeup" and, thus, the ASR component 116 may generate an indication that it has identified the wakeword. In response, the primary device 102 may begin sending the generated audio signal to the remote system 118 via the network 120.

The ASR component 132 of the remote system 118 may generate first text corresponding to the received audio signal. In this example, for instance, the ASR component 132 may generate text corresponding to the request "pair to my new device." The NLU component 134 may then identify an intent associated with this text using techniques described in further detail with reference to FIG. 6. In this example, given that the user is requesting to pair to a new device, the NLU component 134 may route intent data indicative of the user request to the configuration component 136.

In response to receiving the intent data indicative of the request, the configuration component 136 may generate a first instruction to cause the primary device 102 (or another device in the environment) to attempt to detect a new device in the environment. The first instruction may, for example, cause the primary device 102 to attempt to detect any new devices via a short-range wireless communication protocol, such as Bluetooth, ZigBee, or the like. The remote system may then send first-instruction data indicative of the first instruction to the primary device 102, the additional device 104(2), and/or another device in the environment 100.

In this example, the primary device 102 receives the first instruction and, in response, executed the first instruction by attempting to detect new devices in the environment over a short-range wireless protocol using the one or more network interfaces 110. In this example, the primary device 102 may detect identifier data indicative of an identity of the secondary device 104(1). That is, the secondary device 104(1) may emit, over the short-range wireless communication channel, the identifier data identifying the device 104(1). In some instances, the identifier data may identify the type of device of the secondary device 104(1). For example, the identifier data may comprise "smart analog clock", "animatronic toy", or the like.

In response to identifying the secondary device 104(1), the primary device 102 may communicatively couple to the secondary device 104(1), confirm that the user would like to communicatively couple to the secondary device 104(1), or the like. In this example, the primary device 102 may send an indication of the identifier data to the remote system, which may route the information to the configuration component 136. The configuration component 136 may generate second text that is to be converted into audio data for output on the speaker(s) 108 of the primary device 102 or output in another manner, such as via a display or the like. In some instances, the configuration component 136 sends the second text to a text-to-speech (TTS) engine that converts the second text into audio data. The configuration component 136 may then send the audio data to the primary device 102 over the network 120.

The primary device 102 may receive and output the audio data on the speakers 108. In this example, the speakers output the audio data "I've detected a clock. Would you like me to pair to it and update the displayed time?" The primary device 102 may then generate an audio signal based on sound captured by the microphone and may send this audio signal to the remote system 118. In this example, this audio signal may represent the speech "yes, please". In response to receiving the audio signal, the configuration component 136 may generate configuration data for execution by the secondary device 104(1) to cause the secondary device 104(1) to update a position of a movable member of the device. The configuration component 136 may also generate a second instruction to cause the primary device 102 to pair to the secondary device 104(1) and to cause the primary device 102 to send the configuration data to the secondary device 104(1) for execution by the secondary device 104(1). In the illustrated clock example, for instance, the configuration data may cause one or more clock hands of the smart clock to move from a default position to a current position representing the current time. For example, the configuration component 136 may determine how many pulses to cause a microcontroller of the clock to emit to cause a motor of the clock to move one or more hands of the clock to positions associated with the current time, as described above. In other instances, the second instruction may cause a motor to move a member (e.g., sunglasses, appendages, etc.) of an animatronic toy from a first position to a second position, to move a physical cover of a secondary device to expose a first image (e.g., an image of the sun) and hide a second image (e.g., an image of rainclouds), or the like. The configuration component 136 may send the second instruction to the primary device 102 over the network 120.

In some instances, the configuration component 136 may determine or more characteristics of the environment 100 in order to determine how to update the position of the physical member(s) of the secondary device. For example, the configuration component 136 may determine a current time at the environment, current weather at the environment, forecasted weather at the environment, and/or the like. To do so, the configuration component 136 may use identification data received from the primary device 102 and identifying the primary device 102 to locate a profile associated with the primary device. For example, the profile may indicate the location of the primary device 102, which the configuration component 136 may use to determine the characteristics of the environment, such as the time, weather, or the like. In addition, the configuration component 136 may analyze the profile to determine whether certain devices are associated with the profile. For example, upon receiving identification data associated with the secondary device 104(1), the configuration component 136 may determine, using the identification data, whether the secondary device 104(1) is associated with the profile. If not, the configuration component 136 may proceed to performing some or all of the operations described herein. For example, the configuration component 136 may determine the current position of a physical member of the secondary device 104(1), may generate the configuration data, and/or the like.

Upon receiving the second instruction from the remote system 118, the primary device 102 may pair over the short-range wireless communication channel to the secondary device 104(1) and may send the configuration data to the secondary device 104(1). In response to receiving the configuration data, the secondary device 104(1) may update the position(s) of its movable member(s) as specified by the configuration data.

In some instances, the primary device 102 and/or the configuration component 136 may use one or more additional devices in the environment to determine how to configure the new secondary device 104(1). For example, if the secondary device 104(1) comprises a clock, as illustrated, then the primary device 102 may determine whether the environment includes another smart analog clock or other device depicting a current time. If so, the primary device 102 may determine the current time indicated by this additional device, such as the additional device 104(2) and may use this information in configuring the new clock, given that it may indicate a preference of the user. For example, if the clock of the additional device 104(2) is five minutes fast, the primary device 102 may provide this information to the configuration component 136, which may generate configuration data that also causes the newly introduced clock to illustrate a time that is five minutes fast. In still other instances, the primary device 102 may use this additional information to alter the second instruction received from the configuration component and/or generate an additional instruction for sending to the secondary device 104(1). Of course, while this example describes using the additional information for determining a position of a clock hand(s), it is to be appreciated that this information may also be used for determining a preferred position of an accessory or appendage of an animatronic toy, or a preferred position of a physical member of any other secondary device.

As used herein, a processor may include multiple processors and/or a single processor having multiple cores. Further, the processors may comprise one or more cores of different types. For example, the processors may include application processor units, graphic processing units, and so forth. In one implementation, the processor may comprise a microcontroller and/or a microprocessor. The processor(s) described herein may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108, 122, and/or 140 may possess its own local memory, which also may store program components, program data, and/or one or more operating systems.

The computer-readable media described herein may include volatile and nonvolatile memory, removable and non-removable media implemented in any method or technology for storage of information, such as computer-readable instructions, data structures, program component, or other data. Such computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) to execute instructions stored on the computer-readable media. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 114, and/or 128, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) described herein may enable communications between the components and/or devices shown in environment 100 and/or with one or more other remote systems, as well as other networked devices. Such network interface(s) may include one or more network interface controllers (NICs) or other types of transceiver devices to send and receive communications over the network 120.

For instance, each of the network interface(s) 110 and network interfaces of the remote system 118 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) may include a wide area network (WAN) component to enable communication over a wide area network.

In some instances, the remote system 118 may be local to an environment associated the primary device 102, the secondary device 104(1), and/or the additional device 104(2). For instance, the remote system 118 may be located within the additional device 104(2) and/or one or more of the primary device 102 and/or one or more accessory devices.

FIGS. 2A-2F collectively illustrate a flow diagram of an example process 200 for configuring a secondary device in an environment that includes a primary device that communicatively couples to a remote system. It is to be appreciated that the order of operations is not intended to be limiting, but merely illustrative of an implementation(s) of configuring a secondary device. Further, some of the operations may be removed or replaced and/or performed by other entities in different implementations.

Figure 2A:
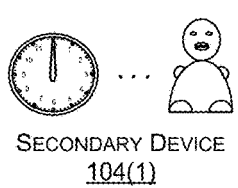
FIGS. 2A-2F collectively illustrate a flow diagram of an example process for configuring a secondary device in an environment that includes a primary device that communicatively couples to a remote system.
Figure 2A:
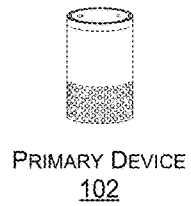
Figure 2A:
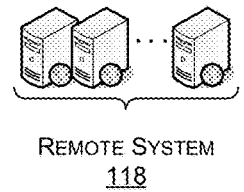
Figure 2A:
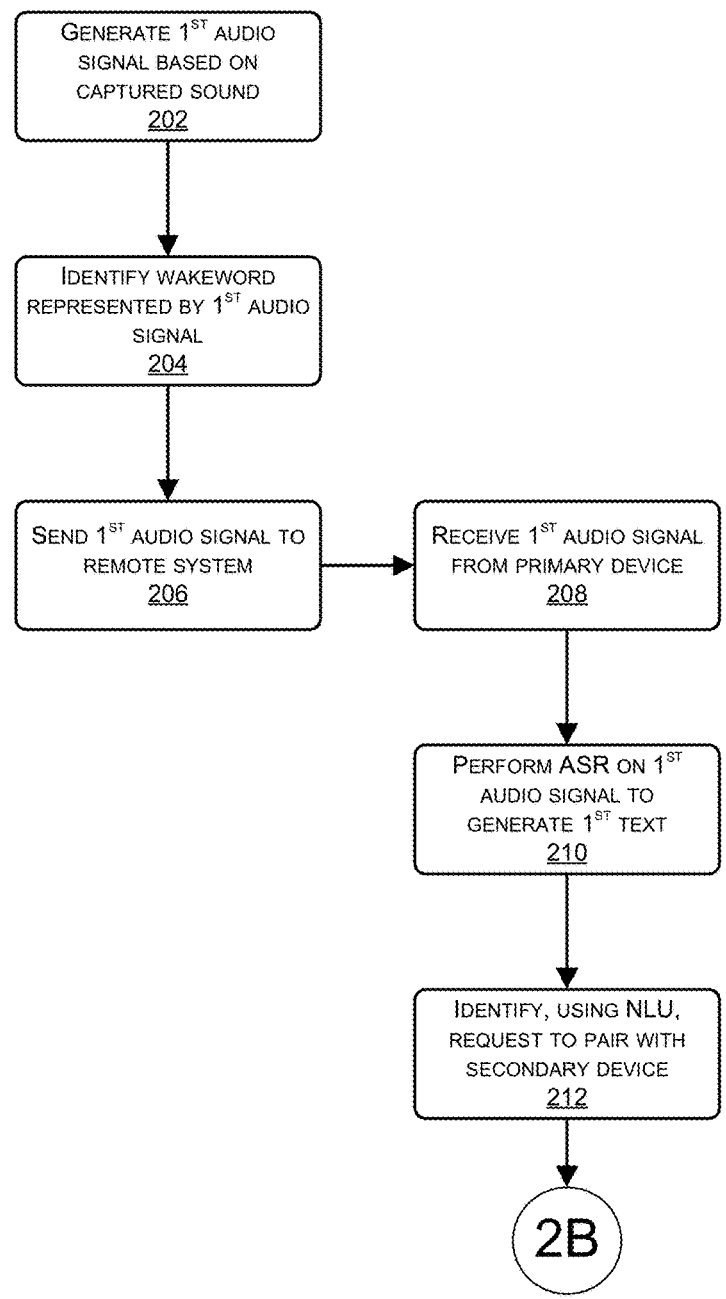

At an operation 202, a primary device 102 generates a first audio signal based on captured sound. In some instances, the first audio signal represents speech indicating a request to couple the primary device to a secondary device and/or to configure a secondary device. Of course, while FIG. 2A illustrates the request being made via speech, in other instances the request may be made via a GUI and/or via any other input interface. Further, while the process 200 is illustrated as initiating based on a request from a user, in other instances described herein a secondary device may be configured in response to a different triggering event, such as a time change occurring in the environment, or the like. In some instances, the secondary device may be configured to move a physical member to a predefined location when a battery level of a battery of the secondary device reaches a particular level, such that if the battery dies the remote system (e.g., the configuration component 136) may determine the position of the physical member when the battery is powered up or replaced and the secondary device is turned back on. That is, the configuration component 136 may use the known position of the physical member (e.g., a position of a clock hand) to determine how to cause the physical member to move to the updated position. For instance, knowing the position of the clock hands (e.g., 12:00) when the clock runs out of power may allow the configuration component 136 to calculate how many pulses to cause the microcontroller to emit to move the clock hands from the known position to the position associated with the current time.

Returning to the illustration, at an operation 204, the primary device 102 identifies the wakeword in the first audio signal. For example, the ASR component 116 of the primary device 102 may generate text corresponding to the generated audio signal and may analyze the generated text to determine whether the text includes the predefined wakeword.

Upon identifying the wakeword, the primary device may begin sending the first audio signal to the remote system 118 at an operation 206. At an operation 208, the remote system 118 receives the first audio signal and, at an operation 210, performs ASR on the first audio signal to generate first text. At an operation 212, the remote system identifies, using NLU, a request to pair the primary device with a secondary device. For example, the NLU component 134 may analyze the text to identify intent data representing the request to pair the primary device 102 to a secondary device.

Figure 2B:
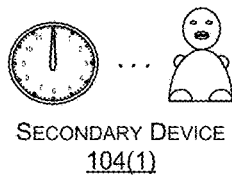
Figure 2B:
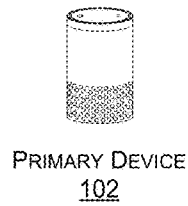
Figure 2B:
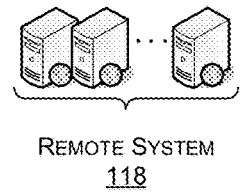
Figure 2B:
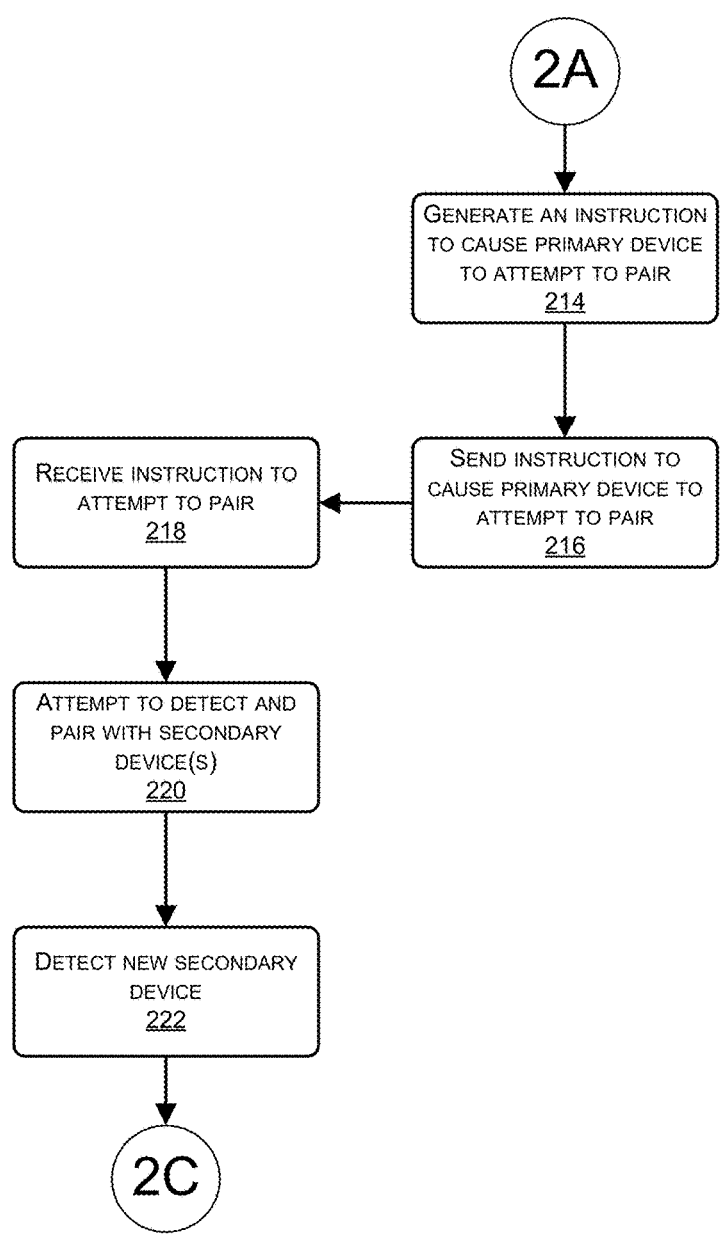

FIG. 2B continues the illustration of the process 200 and includes, at an operation 214, the remote system 118 generating a first instruction to cause the primary device to attempt to pair to a secondary device in an environment of the primary device 102. For example, the first instruction may instruct the primary device 102 to attempt to pair to the secondary device over Bluetooth, ZigBee, or another short range wireless communication protocol. At an operation 216, the remote system 118 sends the first instruction to the primary device 102.

The primary device 102 receives the first instruction at an operation 218. At an operation 220, the primary device 102 executes the first instruction and attempts to detect and pair to a secondary device. At an operation 222, the primary device 102 detects a new secondary device in the environment of the primary device 102.

Figure 2C:
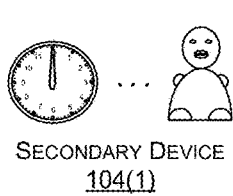
Figure 2C:
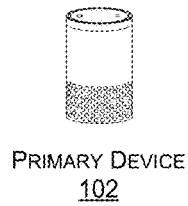
Figure 2C:
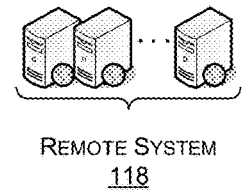
Figure 2C:
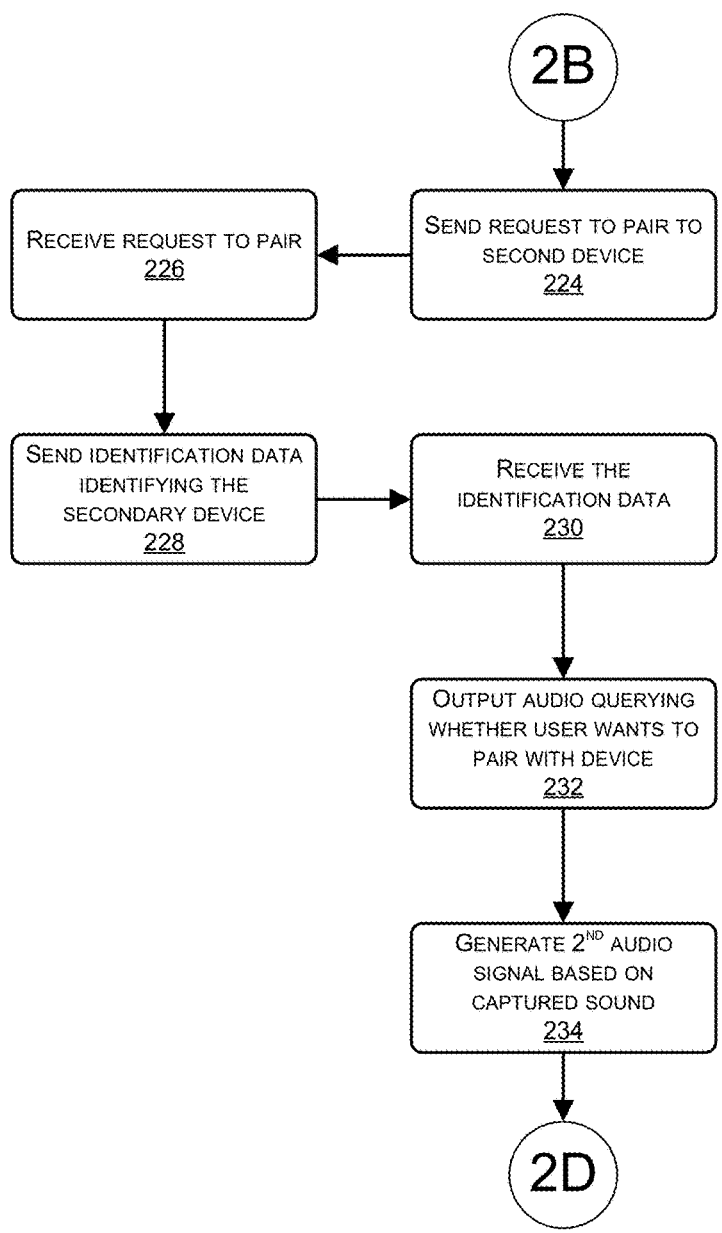

FIG. 2C continues the illustration and includes, at an operation 224, the primary device 102 sending a request to pair to the detected secondary device. At an operation 226, the secondary device 104(1) receives the request to pair to the primary device and at an operation 228 sends identification data identifying the secondary device to the primary device 102 at an operation 228. In other instances, meanwhile, the secondary device 104(1) may send this identification data prior to the primary device 102 requesting to connect to the secondary device 104(1). For example, the primary device 102 may detect this identification data and may use this information for requesting to pair to the secondary device 104(1).

At an operation 230, the primary device 102 may receive the identification data from the secondary device 104(1) and, at an operation 232, may output audio representing a query as to whether a user wants to pair to the identified device. In other instances, meanwhile, the primary device 102 may output this query via a GUI or other output device. At an operation 234, the primary device may generate a second audio signal based on captured sound, with the second audio signal representing speech of the user responsive to the query.

Figure 2D:
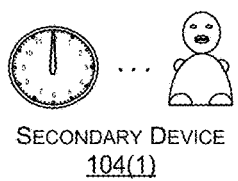
Figure 2D:
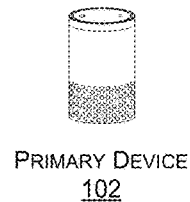
Figure 2D:
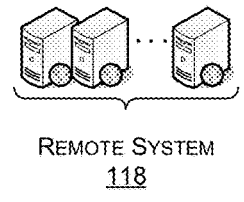
Figure 2D:
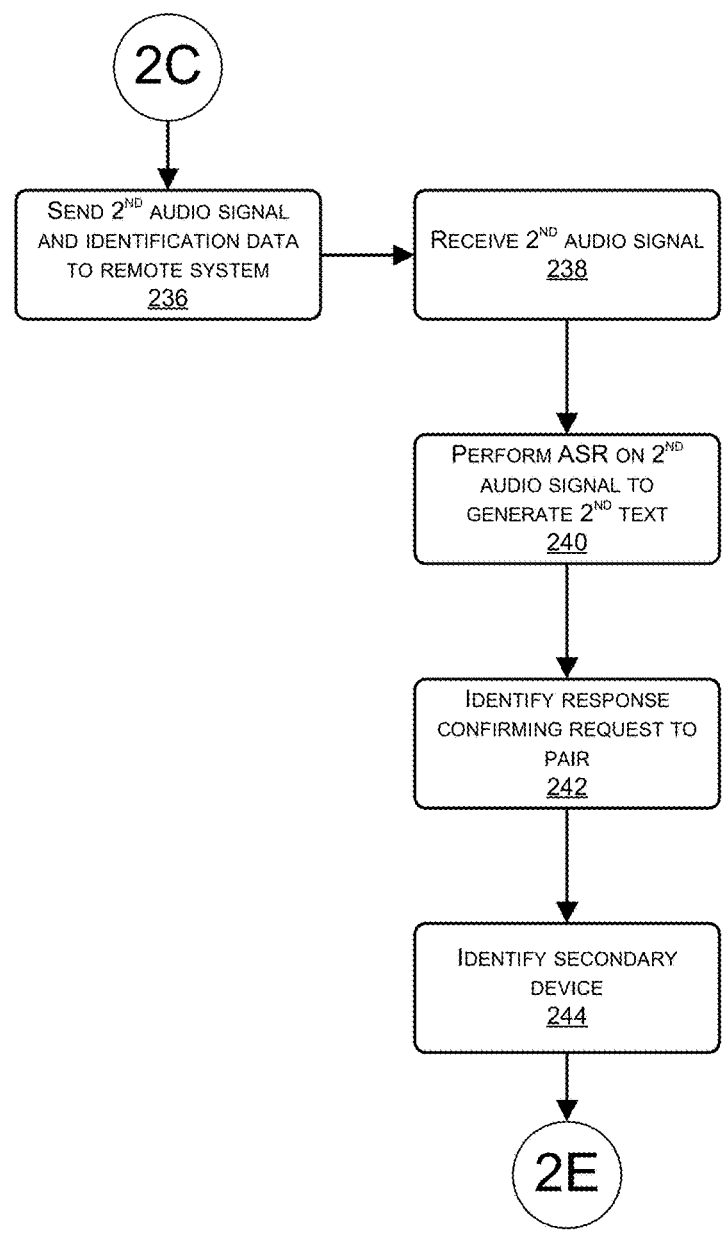

FIG. 2D continues the illustration of the process 200 and includes, at an operation 236, the primary device 102 sending, individually or collectively, the second audio signal and the identification data identifying the secondary device to the remote system 118, which receives this information at an operation 238. In addition, as part of this operation or a previous or subsequent operation, the primary device 102 may send, to the remote system 118, identification data identifying the primary device 102.

At an operation 240, the remote system 118 performs ASR on the second audio signal to generate second text. At an operation 242, the remote system then identifies the response to the query that represents the request to pair to the secondary device. At an operation 244, the remote system identifies the secondary device using the identification data identifying the secondary device.

Figure 2E:
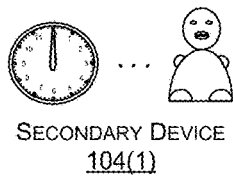
Figure 2E:
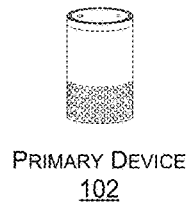
Figure 2E:
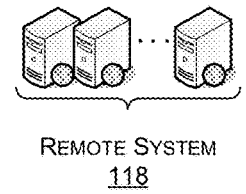
Figure 2E:
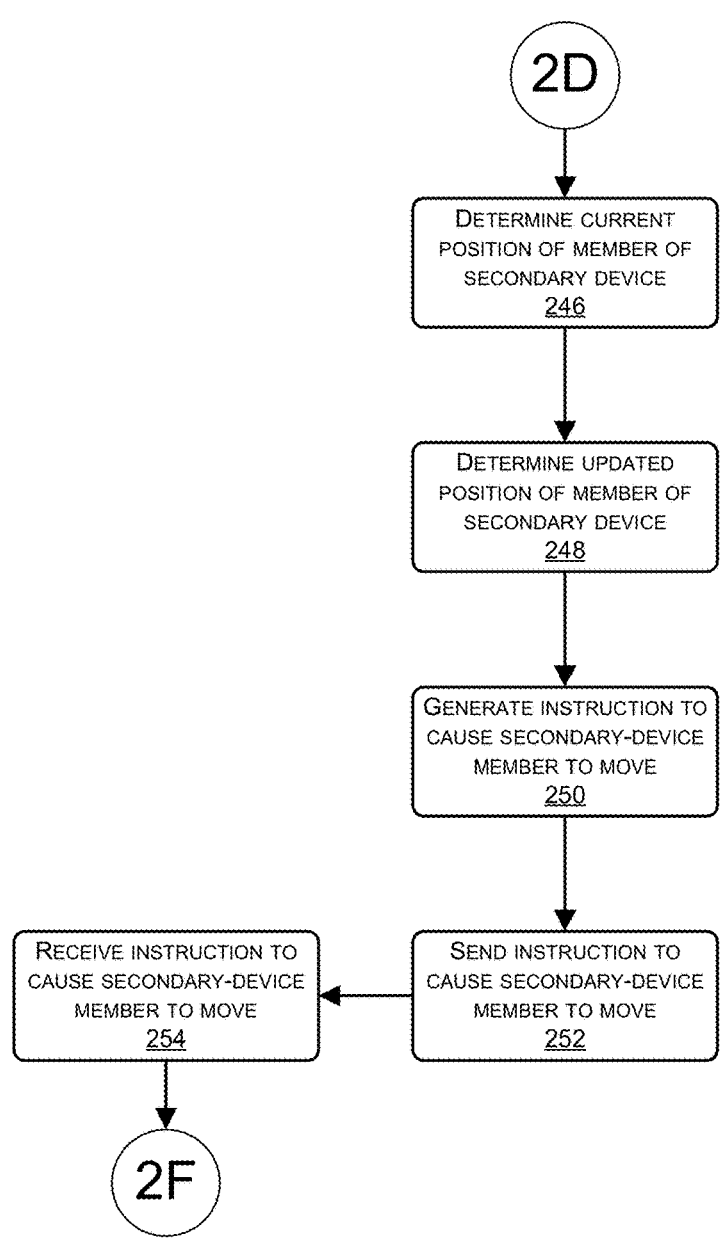

FIG. 2E continues the illustration of the process 200 and includes, at an operation 246, determining a current position of one or more physical members of the secondary device 104(1) using the identification data identifying the secondary device 104(1). For example, the configuration component 136 may determine that the identification data indicates that the secondary device is a particular clock having clock hands that reside at a particular default position when first powered on. At an operation 248, the remote system 118 then determines an updated position of the physical member(s) of the secondary device. For example, if the secondary device 104(1) comprises a clock, the configuration component 136 may determine a current time at the environment of the secondary device and may determine a position of the clock hands corresponding to the current time. In one example, the configuration component determines a profile associated with the primary device 102 using the identification data identifying the primary device 102. The configuration component 136 may then use this profile to determine a geographic location (e.g., address, time zone, etc.) of the environment 100, which the configuration component 136 may use to determine the current time. In other instances, the configuration component may use the profile to identify other information associated with the environment 100 of the devices 102 and 104(1), such as the current weather, forecasted weather, current events at the geographical location of the environment, or the like.

At an operation 250, the configuration component 136 generates a second instruction that, when executed, causes the physical member(s) of the secondary device 104(1) move from the current position to the updated position. For instance, the second instruction may include configuration data indicating how the secondary device is to cause the physical member(s) to move from the current position to the updated position. In one example discussed above, the configuration component 136 may determine, from the identification data identifying the secondary device 104(1), a type of microcontroller used to drive the physical member(s) of the secondary device and may use this information to determine the configuration data. In the example described above, for instance, the configuration component 136 may calculate a number of pulses to cause the microcontroller to emit to cause a motor of an analog clock to move the hand(s) of the clock from the current position corresponding to a default time to an updated position corresponding to a current time. Also as described above, the configuration component 136 may take into account one or more latencies in calculating this number of pulses. The latencies may include network latency, latency associated with the time needed for the motor to move the physical member, and/or the like.

At an operation 252, the configuration component 136 may send the second instruction, including the configuration data, to the primary device 102. At an operation 254, the primary device 102 receives the second instruction from the remote system 118.

Figure 2F:
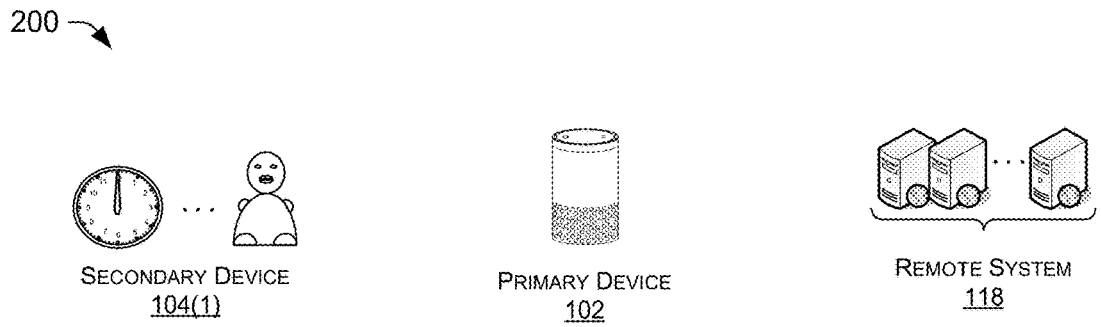
Figure 2F:
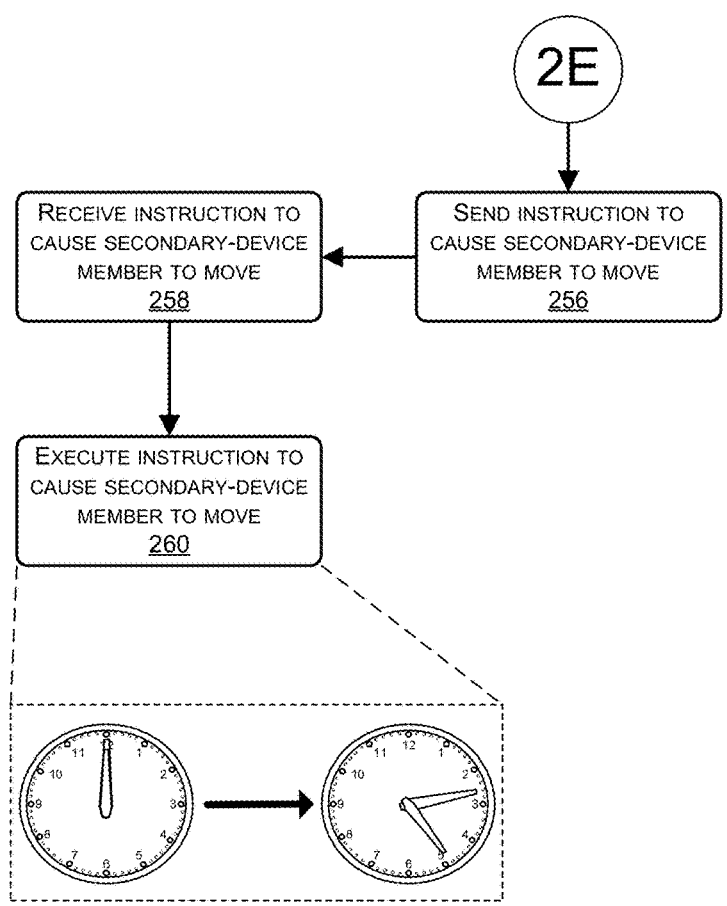

FIG. 2F concludes the illustration of the process 200 and includes, at an operation 256, the primary device 102 sending the second instruction including the configuration data to the secondary device 104(1) for execution by the secondary device 104(1). At an operation 258, the secondary device 104(1) receives the second instruction and, at an operation 260, executes the secondary instruction that includes the configuration data. For example, if the secondary device 104(1) comprises an analog clock, it may use the configuration data to move the clock hands from the current position to the updated position representing the current time. If the secondary device 104(1) comprises an animatronic toy, it may use the configuration data to move an accessory or appendage from the initial position to the updated position.

Figure 3A:
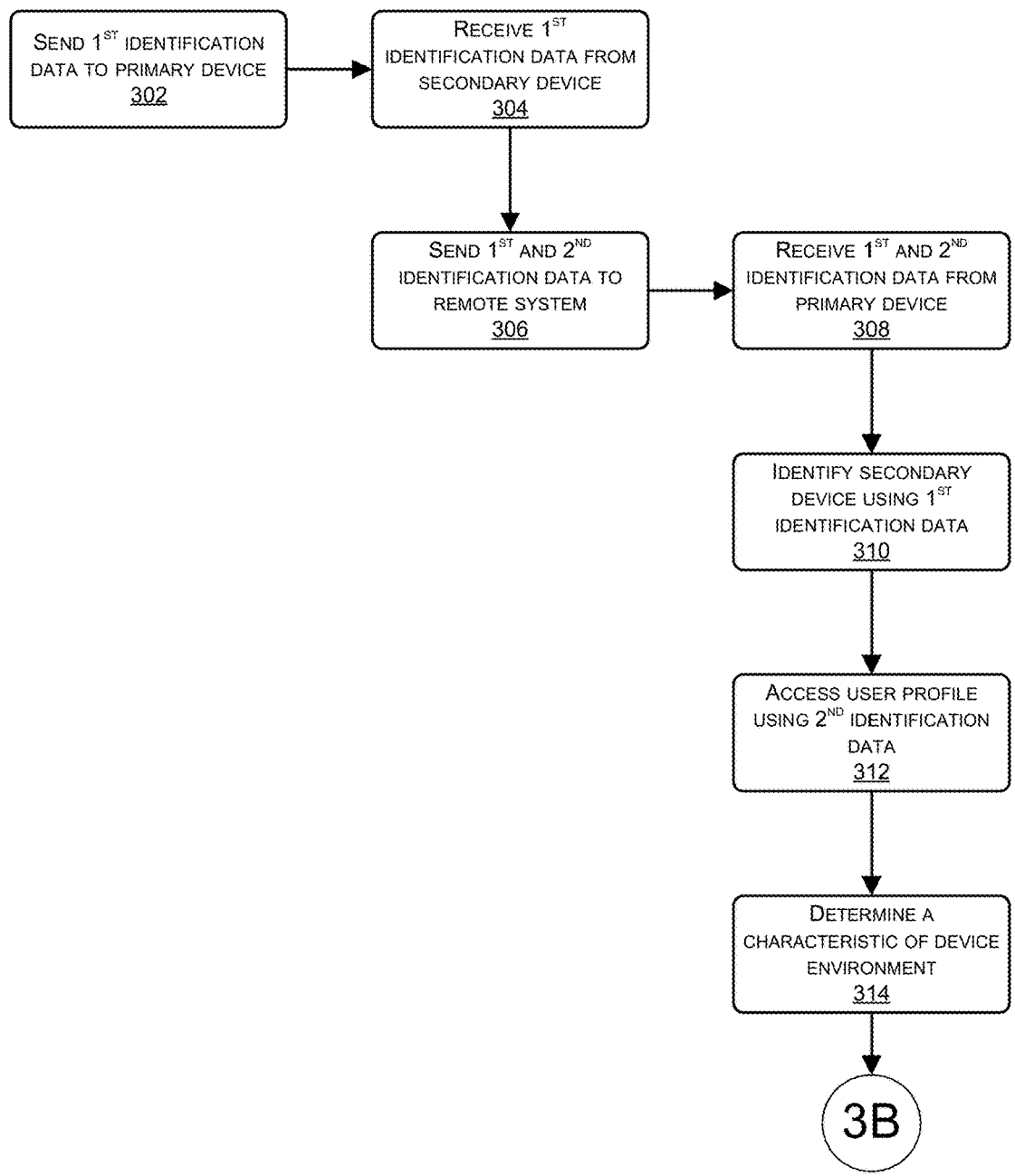
FIGS. 3A-3B collectively illustrate a flow diagram of another example process for configuring a secondary device in an environment that includes a primary device that communicatively couples to a remote system.
Figure 3B:
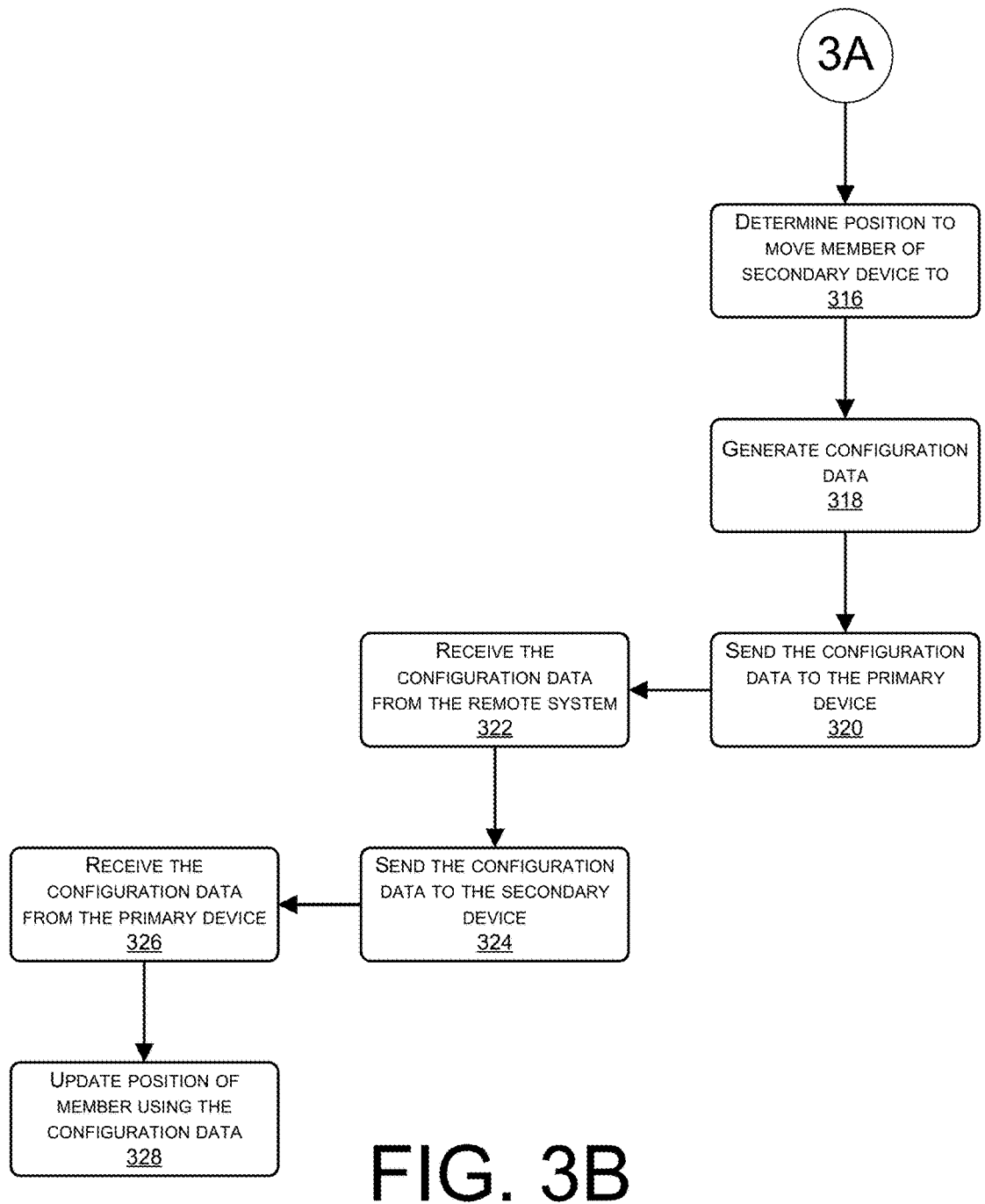

FIGS. 3A-3B collectively illustrate a flow diagram of another example process 300 for configuring a secondary device in an environment that includes a primary device that communicatively couples to a remote system. Again, it is to be appreciated that the order of operations is not intended to be limiting, but merely illustrative of an implementation(s) of configuring a secondary device. Further, some of the operations may be removed or replaced and/or performed by other entities in different implementations.

FIG. 3A illustrates that an operation 302, the secondary device 104(1) may send first identification data to the primary 102. For example, upon being powered on, the secondary device may broadcast its identification data over a long-range or short-range wireless communication protocol, such as Bluetooth, ZigBee, or the like. At an operation 304, the primary device 102 receives the first identification data identifying the secondary device and, at an operation 306, sends the first identification and second identification that identifies the primary device 102 to the remote system 118. The remote system 118 receives the first and second identification data at an operation 308.

At an operation 310, the remote system 118 identifies the secondary device 114(1) using the first identification data. For example, the configuration component 136 may determine whether the secondary device comprises a clock, an animatronic toy, or another type of secondary device. The configuration component 136 may also use this identification data to determine components of the secondary device, such as a type of microcontroller used to drive a motor of the secondary device, pulse length of pulses emitted by the microcontroller, a default (or otherwise current) position of one or more physical member(s) of the secondary device and/or the like.

At an operation 312, the configuration component 136 may access a user profile using the second identification data identifying the primary device 102. For example, the configuration component 136 may determine which user profile is associated with the particular device identifier (DID) of the primary device 102. At an operation 314, the remote system 118 (e.g., the configuration component 136) may determine a characteristic of an environment in which the primary device 102, and hence the secondary device 104(1), resides. As described above, this may include time, weather, or the like.

FIG. 3B continues the illustration of the process 300 and includes, at an operation 316, the configuration component 136 of the remote system determining a position to which to move a physical member of the secondary device 104(1). This position may be determined based on the characteristic of the environment, the identity and type of the secondary device, and/or the like. At an operation 318, the configuration component 136 generates configuration data for causing the physical member of the secondary device to move to the updated position. At an operation 320, the remote system 118 sends the configuration data to the primary device 102, which receives the configuration data at an operation 322. At an operation 324, the primary device 102 then sends along (e.g., via a short-range wireless communication channel) this configuration data to the secondary device 104(1), which receives the configuration data at an operation 326. Finally, at an operation 328 the secondary device uses the configuration data to update the position of the physical member(s). For example, in one example, the secondary device executes the configuration data to cause the microcontroller to emit the calculated number of pulses to cause the motor to move the hands of the clock from the current position to the updated position.

The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

Figure 4:
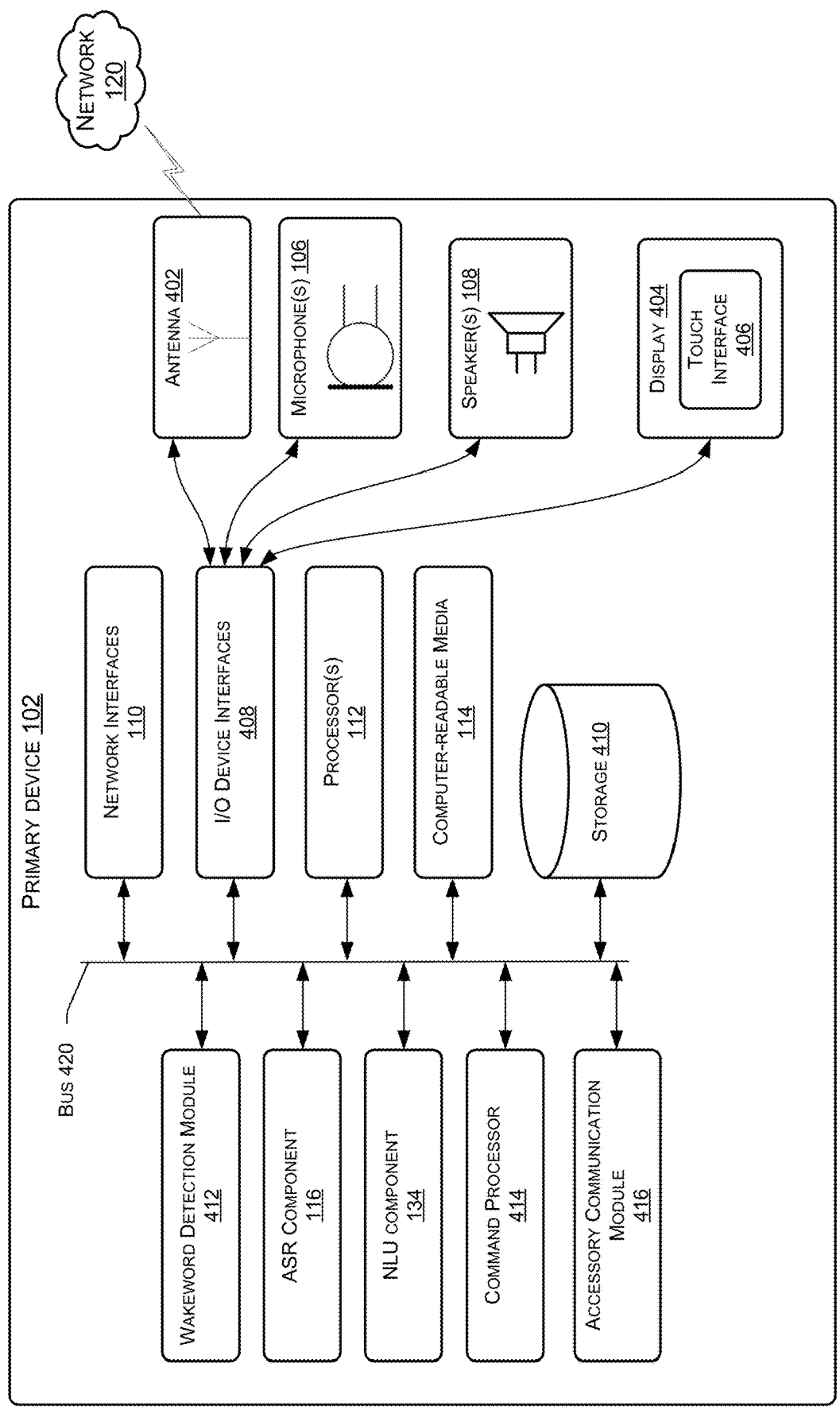
FIG. 4 illustrates a conceptual diagram of example components of a primary device, such as the primary device illustrated in FIG. 1.

FIG. 4 illustrates a conceptual diagram of example components of a primary device 102, such as a voice-controlled device. FIG. 5 illustrates a conceptual diagram of example components of an accessory device 104(1), such as a smart analog clock, an animatronic toy, or the like. In operation, each of these devices (or groups of devices) may include computer-readable and computer-executable instructions that reside on the devices 102 and 104(1), as will be discussed further below.

When embodied as a voice-controlled device, the primary device 102 may be implemented as a standalone device that is relatively simple in terms of functional capabilities with limited input/output components, memory, and processing capabilities. For instance, the voice-controlled device may not have a keyboard, keypad, or other form of mechanical input. The device may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the voice-controlled device. Nonetheless, the primary, and potentially only mode, of user interaction with the device 102 is through voice input and audible output. In some instances, the device 102 may simply comprise one or more microphones 106, a power source, and functionality for sending generated audio data via one or more antennas 402 to another device.

The voice-controlled device may also be implemented as a more sophisticated computing device, such as a computing device similar to, or the same as, a smart phone or personal digital assistant. The device 102 may include a display 404 with a touch interface 406 and various buttons for providing input as well as additional functionality such as the ability to send and receive communications. Alternative implementations of the voice-controlled device 102 may also include configurations as a personal computer. The personal computer may include a keyboard, a mouse, a display, and other hardware or functionality that is found on a desktop, notebook, netbook, or other personal computing devices. In examples, the voice-controlled device may include an automobile, such as a car, and the secondary device 104(1) may be disposed in the car and connected, via wired or wireless coupling, to the car. In other examples, the voice-controlled device may include a pin on a user's clothes or a phone on a user's person, and the secondary device 104(1) may comprise an automobile, such as a car, that operates in coordination with the pin or phone, as described herein. In examples, the voice-controlled device 102 may include speaker(s) 108. In other examples, the voice-controlled device may not include speaker(s) 108 and may utilize speaker(s) of an external or peripheral device to output audio via the speaker(s) of the external/peripheral device. In this example, the voice-controlled device might represent a set-top box (STB), and the device may utilize speaker(s) of a secondary device 104(1) such as a television that is connected to the STB for output of audio via the external speakers. In other examples, the voice-controlled device may not include the microphone(s) 106, and instead, the voice-controlled device can utilize microphone(s) of an external or peripheral device to capture audio and/or generate audio data. In this example, the voice-controlled device may utilize microphone(s) of a headset that is coupled (wired or wirelessly) to the voice-controlled device. These types of devices are provided by way of example and are not intended to be limiting, as the techniques described in this disclosure may be used in essentially any device that has an ability to recognize speech input or other types of natural language input.

Each of these devices 102 and 104(1) of may include one or more controllers/processors 112 and 504, that may include a central processing unit (CPU) for processing data and computer-readable instructions, and computer-readable media 114 and 506 for storing data and instructions of the respective device 102 and 104(1). Each device 102 and 104(1) may also be connected to removable or external non-volatile memory and/or storage, such as a removable memory card, memory key drive, networked storage, etc., through respective input/output device interfaces 408 and 502.

Computer instructions for operating each device 102 and 104(1) and its various components may be executed by the respective device's controller(s)/processor(s) 112 and 504, using the computer-readable media 114 and 506 as temporary "working" storage at runtime. A device's computer instructions may be stored in a non-transitory manner in non-volatile memory, storage 410 and 508, or an external device(s). Alternatively, some or all of the executable instructions may be embedded in hardware or firmware on the respective device 102 and 104(1) in addition to or instead of software.

Each device 102 and 104(1) includes input/output device interfaces 408 and 502. A variety of components may be connected through the input/output device interfaces. Additionally, each device 102 and 104(1) may include an address/data bus 420 and 510 for conveying data among components of the respective device. Each component within a device 102 and 104(1) may also be directly connected to other components in addition to, or instead of, being connected to other components across the bus 420 and 510

The devices 102 and 104(1) may each include a display 404 and 512, which may comprise a touch interface 406 and 514. In other examples, the device 102 may not include a display and the secondary device 104(1) may include the display 512. Any suitable display technology, such as liquid crystal display (LCD), organic light emitting diode (OLED), electrophoretic, and so on, may be utilized for the displays. Furthermore, the processor(s) may comprise graphics processors for driving animation and video output on the associated displays, or the device 102 and 104(1) may be "headless" and may primarily rely on spoken commands for input. As a way of indicating to a user that a connection between another device has been opened, the device 102 and 104(1) may be configured with one or more visual indicators, such as the light source(s) 516, which may also be described as light elements, of the secondary device 104(1), which may be in the form of LED(s) or similar components (not illustrated), that may change color, flash, or otherwise provide visible light output, such as for a light show on the secondary device 104(1), or a notification indicator on the device 102 and 104(1). The input/output device interfaces that connect to a variety of components such as an audio output component such as a speaker for outputting audio (e.g., audio corresponding to audio content, a text-to-speech (TTS) response, etc.), a wired headset or a wireless headset or other component capable of outputting audio. A wired or a wireless audio and/or video port may allow for input/output of audio/video to/from the device 102 and 104(1). The device 102 and 104(1) may also include an audio capture component. The audio capture component may be, for example, a microphone 106 and 520 or array of microphones, a wired headset or a wireless headset, etc. The microphones may be configured to capture audio. If an array of microphones is included, approximate distance to a sound's point of origin may be determined using acoustic localization based on time and amplitude differences between sounds captured by different microphones of the array. The device 102 (using microphone 106, wakeword detection module 412, ASR component 116, etc.) may be configured to generate audio data corresponding to captured audio. The device 102 (using input/output device interfaces 408, antenna 402, etc.) may also be configured to transmit the audio data to the remote system 118 for further processing or to process the data using internal components such as a wakeword detection module 412. In some configurations, the secondary device 104(1) may be similarly configured to generate and transmit audio data corresponding to audio detected by the microphone(s) 520.

Via the antenna(s) 402 and 522, the input/output device interfaces may connect to one or more networks 120 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the devices 102 and 104 via wired connection to an external alternating current (AC) outlet, and/or via onboard power sources, such as batteries, solar panels, etc.

Through the network(s) 120, the speech processing system may be distributed across a networked environment. Accordingly, the device 102 and/or the remote system 118 may include an ASR component 116 and/or 132. The ASR component 116 of device 102 may be of limited or extended capabilities. The ASR component 116 may include language models stored in ASR model storage component, and an ASR component 116 that performs automatic speech recognition. If limited speech recognition is included, the ASR component 116 may be configured to identify a limited number of words, such as keywords detected by the device, whereas extended speech recognition may be configured to recognize a much larger range of words.

The device 102 and/or the remote system 118 may include a limited or extended NLU component 134. The NLU component of device 102 may be of limited or extended capabilities. The NLU component may comprise a name entity recognition module, an intent classification module and/or other components. The NLU component may also include a stored knowledge base and/or entity library, or those storages may be separately located.

The device 102 and/or the remote system 118 may also include a command processor 414 that is configured to execute commands/functions associated with a spoken command as described herein. For example, the command processor 414 may be configured to set a timer associated with a spoken command to set a timer via the device 102.

The device 102 may include a wakeword detection module 412 which may be a separate component or may be included in an ASR component 132. The wakeword detection module 412 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

Figure 5:
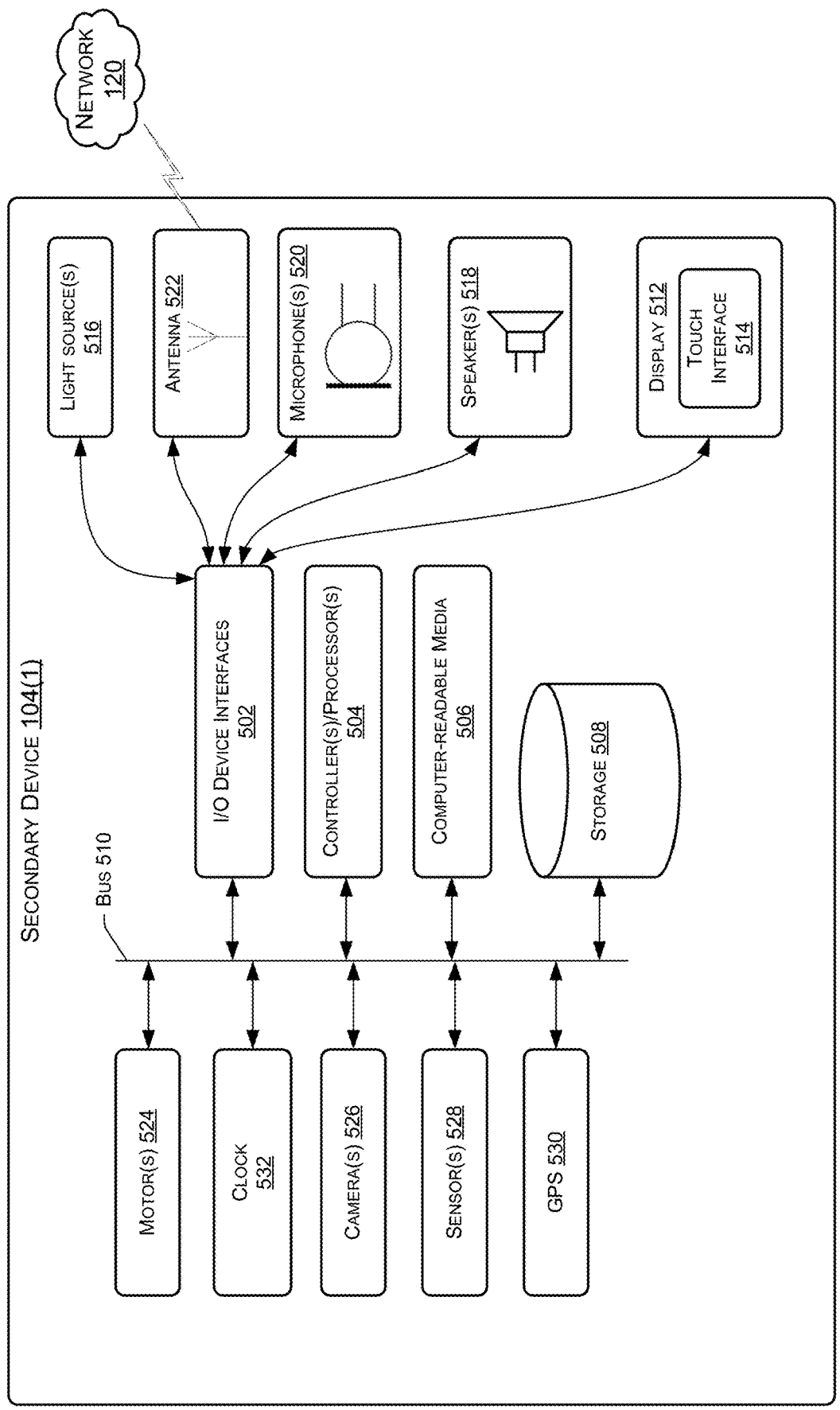
FIG. 5 illustrates a conceptual diagram of example components of a secondary device, such as the secondary device illustrated in FIG. 1.

With reference again to the secondary device 104(1) of FIG. 5, the secondary device 104(1) may include a housing and/or base member. The shape of the housing may be, for example, a sphere, a cube, a pyramid, a cone, or any suitable three-dimensional shape. In examples, the housing may be shaped as a cylinder such that the housing resembles a wall clock, while in other instances the housing resembles an animatronic toy, a thermostat, or the like. In other examples, the housing may resemble an egg timer, a digital clock, and/or a toy configured to display the passage of time. The secondary device 104(1) may include movable or actuating (e.g., pivoting, translating, rotating, etc.) members that operate in accordance with control signals received from the voice-controlled device 102. For example, the secondary device 104(1) may be configured to illustrate the passage of time given a theme of the device, such as a caricature of a mountain climber climbing to the top of a mounting, a ball dropping slowly similar to the start of a new year, a toy train travelling around a track. The secondary device 104(1) may include one or multiple motors 524 for use in actuating such movable members. In this sense, the secondary device 104(1) may be utilized to physically show the passage of time, such as via a timer set by the user issuing voice commands to the voice-controlled device 102, and the voice-controlled device 102 responding by controlling the operation of the accessory device's 104 various components. In some instances, the controllers/processors 504 include a microcontroller configured to emit periodic pulses to cause the motor(s) 524 to cause hands of the clock 532 to move with time. For instance, a microcontroller may emit a pulse every 30 ms to cause the motor to move the second hand one second, the minute hand 1/3600 of a minute, and so forth.

The secondary device 104(1) may be configured (e.g., with computer-executable instructions stored in the memory) to select, or toggle, between multiple available modes based on commands (or instructions) received from the remote system 118 (in some cases, via the voice-controlled device), or based on user input received at the secondary device 104(1) itself and/or a personal device, such as the additional device 104(2) from FIG. 1. For example, the user can ask the voice-controlled device to set the secondary device 104(1) in a particular mode of operation, such as a clock mode, a timer mode, etc., among multiple available modes of operation, and the secondary device 104(1) may select the particular mode to cause various components, such as the light source(s) 516, the display 512, etc., to operate in a particular manner based on the selected mode of operation.

A camera 526 can be mounted on the secondary device 104(1) and utilized for purposes like facial recognition and determining the presence or absence of a user in the vicinity of the secondary device 104(1) based on movement detection algorithms, etc. The camera 526 may also be used for locating the user when the user emits an audio utterance in the vicinity of the secondary device 104(1). Alternative methods, such as echo-location and triangulation approaches, can also be used to locate the user in the room.

The secondary device 104(1) may include additional sensors 528 for various purposes, such as accelerometers for movement detection, temperature sensors (e.g., to issue warnings/notifications to users in the vicinity of the accessory, and other types of sensors 528. A global positioning sensor (GPS) 530 may be utilized for location determination of the secondary device 104(1).

The memory of the secondary device 104(1) may store computer-executable instructions that, when executed by the controller(s)/processor(s) 504, cause the secondary device 104(1) to discover other accessory devices 104 registered to the user. The secondary device 104(1) may be configured to publish an identifier, such as an IP address, for this purpose that is sent to the remote system 118 (e.g., via the primary device 102) and each accessory may receive identifiers of all other accessories registered to the user from the remote system 118 (e.g., via the primary device 102). In this manner, secondary devices may recognize each other and perform in a synchronized or meaningful way. Any suitable network protocol, such as UPnP, may be utilized to connect devices in this manner. Devices can also communicate using high frequency, such as a frequency inaudible to humans, tones and a modulator-demodulator algorithm to transmit data over audio.

Computer-executable instructions may be stored in the memory of the secondary device 104(1) that, when executed by the controller(s)/processor(s) 504, cause various components of the secondary device 104(1) to operate in a synchronized manner (i.e., in coordination) with audio output via speakers of the voice-controlled device 102 and/or via speakers of the secondary device 104(1). For example, secondary device 104(1) may be configured to process control information that it receives from the remote system 118, possibly routed through the device 102, and which is associated with an audio file or other TTS data that is to be output as synthesized speech output. In this manner, the secondary device 104(1) may display digital animations on the display 512, operate the light sources 516, and/or actuate movable members of the secondary device 104(1) in synchronization with the audio corresponding to, for example, an audio file, timer data file, TTS response, etc. Accordingly, the secondary device 104(1) may receive the control information, possibly along with the associated audio data. The control information can include, without limitation, timer data.

Figure 6:
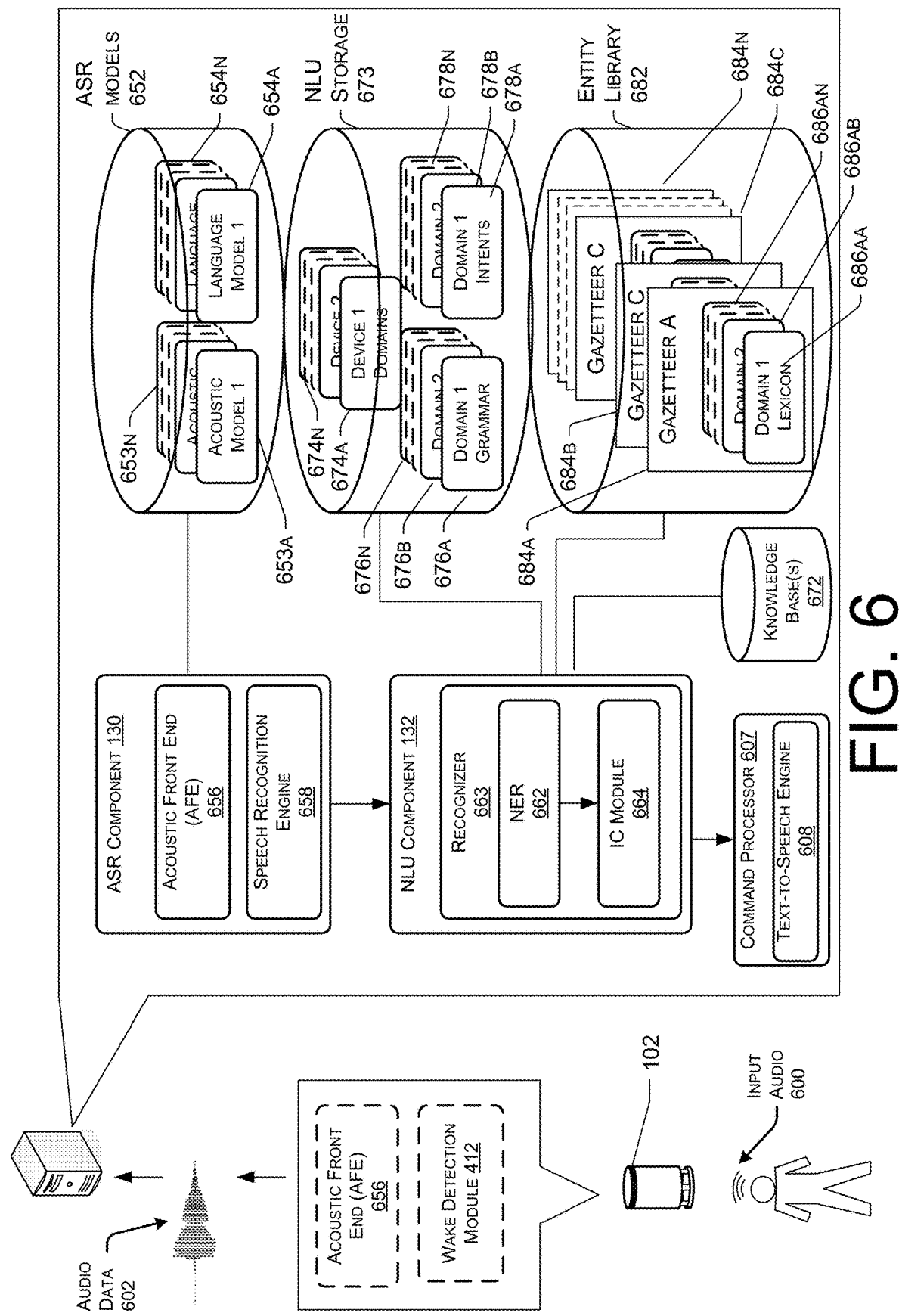
FIG. 6 illustrates a conceptual diagram of components of a speech processing system for processing audio data provided by one or more devices, such as the primary device of FIG. 1.

FIG. 6 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 118). The various components illustrated may be located on a same or different physical devices. Communication between various components illustrated in FIG. 6 may occur directly or across a network 120. An audio capture component, such as a microphone 106 of the device 102, or another device, captures audio 600 corresponding to a spoken utterance. The device 102 or 106, using a wakeword detection module 412, then processes audio data corresponding to the audio 600 to determine if a keyword (such as a wakeword) is detected in the audio data. Following detection of a wakeword, the device 102 or 106 sends audio data 602 corresponding to the utterance to the remote system 118 that includes an ASR component 130. The audio data 602 may be output from an optional acoustic front end (AFE) 656 located on the device prior to transmission. In other instances, the audio data 602 may be in a different form for processing by a remote AFE 656, such as the AFE 656 located with the ASR component 130 of the remote system 118.

The wakeword detection module 412 works in conjunction with other components of the user device, for example a microphone to detect keywords in audio 400. For example, the device may convert audio 400 into audio data, and process the audio data with the wakeword detection module 412 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection module 412 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 412 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 602 corresponding to input audio 600 to the remote system 118 for speech processing. Audio data corresponding to that audio may be sent to remote system 118 for routing to a recipient device or may be sent to the remote system 118 for speech processing for interpretation of the included speech (either for purposes of enabling voice-communications and/or for purposes of executing a command in the speech). The audio data 602 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 118, an ASR component 130 may convert the audio data 602 into text data. The ASR transcribes audio data into text data representing the words of the speech contained in the audio data 602. The text data may then be used by other components for various purposes, such as executing system commands, inputting data, etc. A spoken utterance in the audio data is input to a processor configured to perform ASR which then interprets the utterance based on the similarity between the utterance and pre-established language models 654 stored in an ASR model knowledge base (ASR Models Storage 652). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 653 stored in an ASR Models Storage 652), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 603 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 656 and a speech recognition engine 658. The acoustic front end (AFE) 656 transforms the audio data from the microphone into data for processing by the speech recognition engine 658. The speech recognition engine 658 compares the speech recognition data with acoustic models 653, language models 654, and other data models and information for recognizing the speech conveyed in the audio data. The AFE 656 may reduce noise in the audio data and divide the digitized audio data into frames representing time intervals for which the AFE 656 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 658 may process the output from the AFE 656 with reference to information stored in speech/model storage (652). Alternatively, post front-end processed data (such as feature vectors) may be received by the device executing ASR processing from another source besides the internal AFE. For example, the user device may process audio data into feature vectors (for example using an on-device AFE 656) and transmit that information to a server across a network for ASR processing. Feature vectors may arrive at the remote system 118 encoded, in which case they may be decoded prior to processing by the processor executing the speech recognition engine 658.

The speech recognition engine 658 attempts to match received feature vectors to language phonemes and words as known in the stored acoustic models 653 and language models 654. The speech recognition engine 658 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Wakeup, pair with my new clock." The wake detection module may identify the wake word, otherwise described as a trigger expression, "Wakeup," in the user utterance and may "awaken" based on identifying the wake word. Audio data corresponding to the user utterance may be sent to the remote system 118, where the speech recognition engine 658 may identify, determine, and/or generate text data corresponding to the user utterance, here "pair with my new clock."

The speech recognition engine 658 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 658 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 118, for natural language understanding (NLU) processing, such as conversion of the text into commands for execution, either by the user device, by the remote system 118, or by another device (such as a server running a specific application like a search engine, etc.).

The device performing NLU processing may include various components, including potentially dedicated processor(s), memory, storage, etc. As shown in FIG. 6, an NLU component 134 may include a recognizer 663 that includes a named entity recognition (NER) module 662 which is used to identify portions of query text that correspond to a named entity that may be recognizable by the system. A downstream process called named entity resolution links a text portion to a specific entity known to the system. To perform named entity resolution, the system may utilize gazetteer information (684a-684n) stored in entity library storage 682. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR based on the utterance input audio 600) and attempts to make a semantic interpretation of the text. That is, the NLU process determines the meaning behind the text based on the individual words and then implements that meaning. NLU processing interprets a text string to derive an intent or a desired action from the user as well as the pertinent pieces of information in the text that allow a device (e.g., device 102) to complete that action. For example, if a spoken utterance is processed using ASR and outputs the text "pair to my new clock" the NLU process may determine that the user intended to couple a primary device to a new device in the environment of the primary device.

The NLU may process several textual inputs related to the same utterance. For example, if the ASR component 132 outputs N text segments (as part of an N-best list), the NLU may process all N outputs to obtain NLU results.

As will be discussed further below, the NLU process may be configured to parse and tag to annotate text as part of NLU processing. For example, for the text "set a timer for 10 minutes," "set timer" may be tagged as a command (to output audio on a device) and "10 minutes" may be tagged as the amount of time to set the timer for.

To correctly perform NLU processing of speech input, an NLU process may be configured to determine a "domain" of the utterance so as to determine and narrow down which services offered by the endpoint device (e.g., remote system 118 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 662 receives a query in the form of ASR results and attempts to identify relevant grammars and lexical information that may be used to construe meaning. To do so, the NLU component 134 may begin by identifying potential domains that may relate to the received query. The NLU storage 673 includes a database of devices (674a-674n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 663, language model and/or grammar database (676a-676n), a particular set of intents/actions (678a-678n), and a particular personalized lexicon (686). Each gazetteer (684a-684n) may include domain-indexed lexical information associated with a particular user and/or device. For example, the Gazetteer A (684a) includes domain-index lexical information 686aa to 686an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (IC) module 664 parses the query to determine an intent or intents for each identified domain, where the intent corresponds to the action to be performed that is responsive to the query. Each domain is associated with a database (678a-1678n) of words linked to intents. For example, a music intent database may link words and phrases such as "quiet," "volume off," and "mute" to a "mute" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC module 664 identifies potential intents for each identified domain by comparing words in the query to the words and phrases in the intents database 678. In some instances, the determination of an intent by the IC module 664 is performed using a set of rules or templates that are processed against the incoming text to identify a matching intent.

In order to generate a particular interpreted response, the NER 662 applies the grammar models and lexical information associated with the respective domain to actually recognize a mention of one or more entities in the text of the query. In this manner, the NER 662 identifies "slots" or values (i.e., particular words in query text) that may be needed for later command processing. Depending on the complexity of the NER 662, it may also label each slot with a type of varying levels of specificity (such as noun, place, city, artist name, song name, amount of time, timer number, or the like). Each grammar model 676 includes the names of entities (i.e., nouns) commonly found in speech about the particular domain (i.e., generic terms), whereas the lexical information 686 from the gazetteer 684 is personalized to the user(s) and/or the device. For instance, a grammar model associated with the shopping domain may include a database of words commonly used when people discuss shopping.

The intents identified by the IC module 664 are linked to domain-specific grammar frameworks (included in 676) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "set a timer" is an identified intent, a grammar (676) framework or frameworks may correspond to sentence structures such as "set a timer for {amount of time}" and/or "timer for {amount of time}."

For example, the NER module 662 may parse the query to identify words as subject, object, verb, preposition, etc., based on grammar rules and/or models, prior to recognizing named entities. The identified verb may be used by the IC module 664 to identify intent, which is then used by the NER module 662 to identify frameworks. A framework for the intent of "play a song," meanwhile, may specify a list of slots/fields applicable to play the identified "song" and any object modifier (e.g., specifying a music collection from which the song should be accessed) or the like. The NER module 662 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 662 may search the database of generic words associated with the domain (in the knowledge base 672).

The output data from the NLU processing (which may include tagged text, commands, etc.) may then be sent to a command processor 607. The destination command processor 607 may be determined based on the NLU output. For example, if the NLU output includes a command to send a message, the destination command processor 607 may be a message sending application, such as one located on the user device or in a message sending appliance, configured to execute a message sending command. If the NLU output includes a search request, the destination command processor 607 may include a search engine processor, such as one located on a search server, configured to execute a search command. After the appropriate command is generated based on the intent of the user, the command processor 607 may provide some or all of this information to a text-to-speech (TTS) engine 608. The TTS engine 608 may then generate an actual audio file for outputting the audio data determined by the command processor 607 (e.g., "would you like me to pair to your new clock?"). After generating the file (or "audio data"), the TTS engine 607 may provide this data back to the remote system 118.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 134 during runtime operations where NLU operations are performed on text (such as text output from an ASR component 132). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 663. Each recognizer may include various NLU components such as an NER component 662, IC module 664 and other components such as an entity resolver, or other components.

For example, a messaging domain recognizer 663-A (Domain A) may have an NER component 662-A that identifies what slots (i.e., portions of input text) may correspond to particular words relevant to that domain. The words may correspond to entities such as (for the messaging domain) a recipient. An NER component 662 may use a machine learning model, such as a domain specific conditional random field (CRF) to both identify the portions corresponding to an entity as well as identify what type of entity corresponds to the text portion. The messaging domain recognizer 663-A may also have its own intent classification (IC) component 664-A that determines the intent of the text assuming that the text is within the proscribed domain. An IC component may use a model, such as a domain specific maximum entropy classifier to identify the intent of the text, where the intent is the action the user desires the system to perform. For this purpose, the remote system 118 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 118, as illustrated herein are exemplary, and may be located in a stand-alone device or may be included, in whole or in part, as a component of a larger device or system, may be distributed across a network or multiple devices connected by a network, etc.

Figure 7:
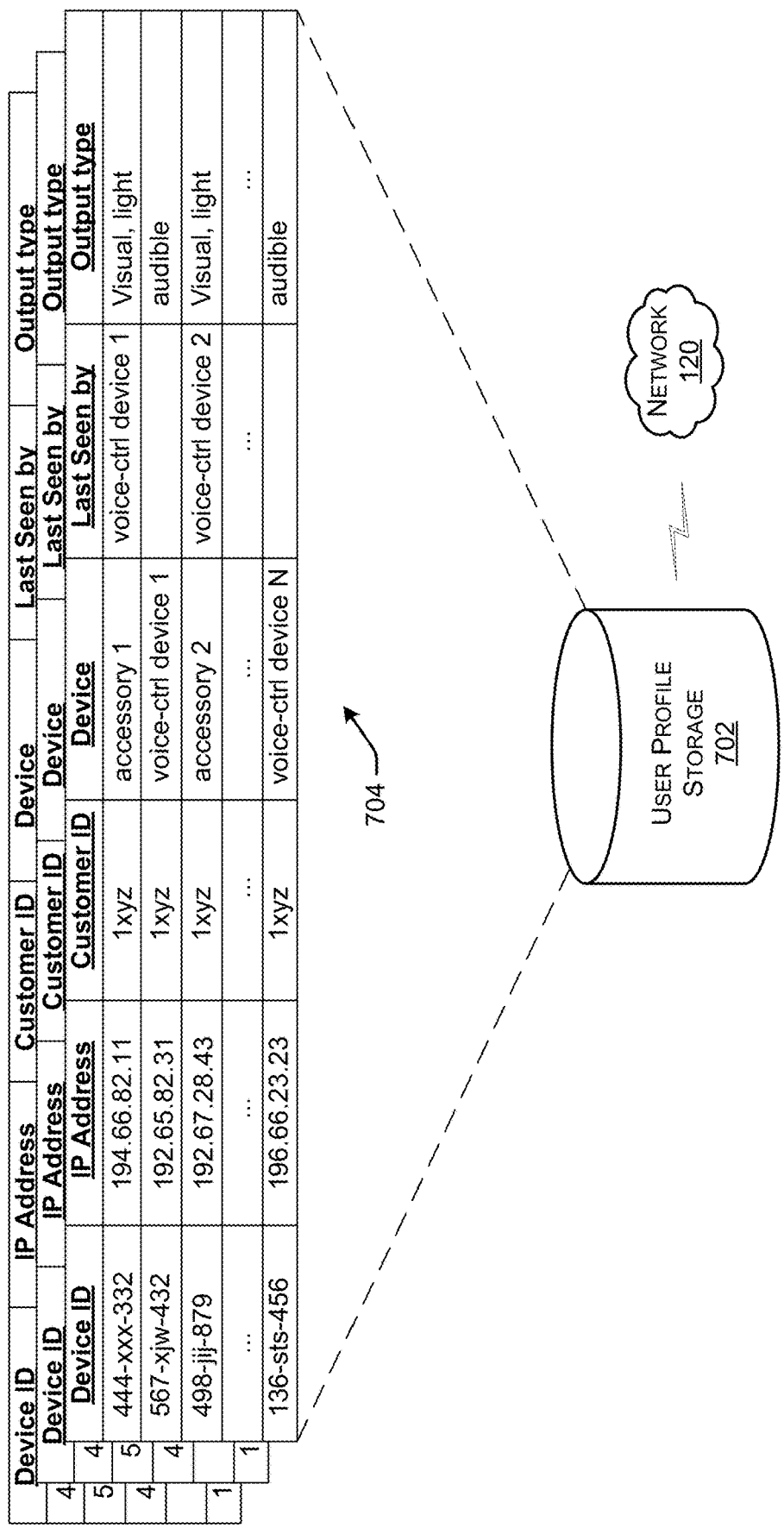
FIG. 7 illustrates a user profile storage that includes data regarding user profiles, which may be used in configuring one or more secondary devices.

FIG. 7 illustrates a user profile storage 702 that includes data regarding user profiles 1404. The user profile storage 702 may be part of, or proximate to, the remote system 118, or may otherwise be in communication with various components, for example over the network 120. The user profile storage 702 may include a variety of information related to individual users, accounts, etc. that interact with the device 102, the one or more accessory devices 104, and/or the remote system 118. For illustration, as shown in FIG. 7, the user profile storage 702 may include data regarding the devices associated with particular individual user profiles 704. In an example, the user profile storage 702 is a cloud-based storage. Such data may include device identifier (ID) and internet protocol (IP) address information for different devices as well as names by which the devices may be referred to by a user. Further qualifiers describing the devices may also be listed along with a description of the type of object of the device.

A particular user profile 704 may include a variety of data that may be used by the system. For example, a user profile may include information about what accessory devices 104 are associated with the user and/or the user device 102. The profile 704 may include, for accessory devices 104, a voice-controlled device 102 by which the accessory was "last seen." In this manner, in instances where the user moves an secondary device 104(1) about an environment, such as from the kitchen to a bedroom, that includes multiple voice-controlled devices 102, the secondary device 104(1) can wirelessly pair with a closest voice-controlled device 102 in proximity to the secondary device 104(1) and this information can be sent to the remote system 118 to dynamically update the profile 704 with the voice-controlled device 102 that was last paired with the accessory 104. This accessory-to-device association can be dynamically updated as locations of the devices 102 and 104 change within the environment. Furthermore, the remote system 118 can use these accessory-to-device associations to determine which devices to send information and instructions to in order to coordinate the operation of an accessory 104 with an appropriate voice-controlled device 102. The profile 1404 may also include information about how a particular accessory 104 may operate (e.g., display output, light source operation, animatronic movement, audio output, etc.). A user profile 704 may also contain a variety of information that may be used to check conditional statements such as address information, contact information, default settings, device IDs, user preferences, or the like.

In some instances, the user profile 704 may be used to identify a characteristic of an environment, which in turn may be used to generate the configuration data for configuring a new secondary device, as discussed above. For instance, when a primary device sends a request to the remote system 118 to pair to a new device, the configuration component 136 may use identification data identifying the primary device 102 to determine the associated profile. The profile may then be used to identify a location of the primary device. For example, the IP address of the primary device may be used to determine a geographic region of the primary device, which may be used to determine a current time, weather, or the like at that geographic region. Again, this information may be used to generate the configuration data for the secondary device. Of course, while the above example describes using an IP address to determine a location of the primary device, in other instances the profile 704 may store the raw location data (e.g., city and state, physical address, etc.) and/or the location may be determined from the profile 704 in another manner. In still other instance, some or all of this profile data 704 may be stored locally at the primary device 102 or at another device in the environment. Thus, the primary device may use this information for determining some or all of the configuration data. In one example, the primary device 102 may store certain preference data (e.g., that a particular user prefers to keep her clocks five minutes fast) and thus may use this preference data for determining a position at which a physical member of a secondary device should be moved to.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   determining a current position of a physical member of a first device residing at a first location in an environment;
   determining an updated position to which the physical member is to be moved while the first device remains at the first location in the environment;
   generating computer-executable configuration data that, when executed by one or more processors of the first device, causes the first device to move the physical member to the updated position while the first device remains at the first location in the environment; and
   sending the computer-executable configuration data to a second device in the environment, the second device to send the computer-executable configuration data to the first device to cause the first device to move the physical member of the first device to the updated position while the first device remains at the first location in the environment.

2. The method as recited in claim 1, further comprising:
   receiving audio data from at least one of the second device or a third device in the environment, the audio data representing user speech comprising a request associated with the first device; and analyzing the audio data to identify the request;
   and wherein the generating the computer-executable configuration data comprises generating, based at least in part on identifying the request, the computer-executable configuration data that, when executed by the one or more processors of the first device, causes the first device to move the physical member to the updated position.

3. The method as recited in claim 1, further comprising:
   receiving audio data from at least one of the second device or a third device in the environment, the audio data representing user speech comprising a request associated with the first device and including identification data associated with the first device; and
   analyzing the audio data to identify the request and the identification data.

4. The method as recited in claim 1, further comprising:
   receiving, from at least one of the second device or a third device in the environment, identification data that identifies at least one of the first device or the second device;
   determining, using the identification data, an account associated with at least one of the first device or the second device; and
   determining, from the account, at least one characteristic associated with the environment;
   and wherein the generating comprises generating the computer-executable configuration data based at least in part on the at least one characteristic.

5. The method as recited in claim 1, further comprising:
receiving audio data from the second device, the audio data representing user speech comprising a request to pair the second device with the first device;
analyzing the audio data to identify the request to pair the second device with the first device; and
sending, to the second device, an instruction to cause the second device to detect the first device using a wireless network interface of the second device.

6. The method as recited in claim 1, wherein the computer-executable configuration data comprises first computer-executable configuration data, and the method further comprises:
receiving, from at least one of the second device or a third device in the environment, second computer-executable configuration data indicative of a current configuration associated with the environment; and
wherein the generating the first computer-executable configuration data comprises generating the first computer-executable configuration data based at least in part on the second computer-executable configuration data.

7. The method as recited in claim 1, wherein the updated position comprises a first updated position, and the method further comprises:
detecting occurrence of a trigger event; and
at least partly in response to detecting occurrence of the trigger event:
determining a second updated position to which the physical member of the first device is to be moved;
generating second computer-executable configuration data that, when executed by the one or more processors of the first device, causes the first device to move the physical member of the first device to the second updated position; and
sending the second computer-executable configuration data to the second device, the second device to send the second computer-executable configuration data to the first device to cause the first device to move the physical member to the second updated position.

8. A system comprising:
one or more processors; and
one or more computer-readable media storing computer-executable instructions that, when executed, cause the one or more processors to perform actions comprising:
determining a current position of a physical member of a first device residing at a first location in an environment;
determining an updated position to which the physical member is to be moved while the first device remains at the first location in the environment;
generating computer-executable configuration data that, when executed by one or more processors of the first device, causes the first device to move the physical member to the updated position while the first device remains at the first location in the environment; and
sending the computer-executable configuration data to a second device in the environment, the second device to send the computer-executable configuration data to the first device to cause the first device to move the physical member of the first device to the updated position while the first device remains at the first location in the environment.

9. The system as recited in claim 8, wherein the one or more computer-readable media further stores computer-executable instructions that, when executed, cause the one or more processors to perform acts comprising:
receiving audio data from at least one of the second device or a third device in the environment, the audio data representing user speech comprising a request associated with the first device; and
analyzing the audio data to identify the request;
and wherein the generating the computer-executable configuration data comprises generating, based at least in part on identifying the request, the computer-executable configuration data that, when executed by one or more processors of the first device, causes the first device to move the physical member to the updated position.

10. The system as recited in claim 8, wherein the one or more computer-readable media further stores computer-executable instructions that, when executed, cause the one or more processors to perform acts comprising:
receiving audio data from at least one of the second device or a third device in the environment, the audio data representing user speech comprising a request associated with the first device and including identification data associated with the first device; and
analyzing the audio data to identify the request and the identification data.

11. The system as recited in claim 8, wherein the one or more computer-readable media further stores computer-executable instructions that, when executed, cause the one or more processors to perform acts comprising:
receiving, from at least one of the second device or a third device in the environment, identification data that identifies at least one of the first device or the second device;
determining, using the identification data, an account associated with at least one of the first device or the second device; and
determining, from the account, at least one characteristic associated with the environment;
and wherein the generating comprises generating the computer-executable configuration data based at least in part on the at least one characteristic.

12. The system as recited in claim 8, wherein the one or more computer-readable media further stores computer-executable instructions that, when executed, cause the one or more processors to perform acts comprising:
receiving audio data from the second device, the audio data representing user speech comprising a request to pair the second device with the first device;
analyzing the audio data to identify the request to pair the second device with the first device; and
sending, to the second device, an instruction to cause the second device to detect the first device using a wireless network interface of the second device.

13. The system as recited in claim 8, wherein the computer-executable configuration data comprises first computer-executable configuration data, and the one or more computer-readable media further stores computer-executable instructions that, when executed, cause the one or more processors to perform acts comprising:
receiving, from at least one of the second device or a third device in the environment, second computer-executable configuration data indicative of a current configuration associated with the environment; and
wherein the generating the first computer-executable configuration data comprises generating the first computer-executable configuration data based at least in part on the second computer-executable configuration data.

14. The system as recited in claim 8, wherein the updated position comprises a first updated position, and wherein the one or more computer-readable media further stores computer-executable instructions that, when executed, cause the one or more processors to perform acts comprising:
- detecting occurrence of a trigger event; and
- at least partly in response to detecting occurrence of the trigger event:
  - determining a second updated position to which the physical member of the first device is to be moved;
  - generating second computer-executable configuration data that, when executed by one or more processors of the first device, causes the first device to move the physical member of the first device to the second updated position; and
  - sending the second computer-executable configuration data to the second device, the second device to send the second computer-executable configuration data to the first device to cause the first device to move the physical member to the second updated position.

15. One or more non-transitory computer-readable media storing computer-executable instructions that, when executed, cause one or more processors to perform actions comprising:
- determining a current position of a physical member of a first device residing at a first location in an environment;
- determining an updated position to which the physical member is to be moved while the first device remains at the first location in the environment;
- generating computer-executable configuration data that, when executed by one or more processors of the first device, causes the first device to move the physical member to the updated position while the first device remains at the first location in the environment; and
- sending the computer-executable configuration data to a second device in the environment, the second device to send the computer-executable configuration data to the first device to cause the first device to move the physical member of the first device to the updated position while the first device remains at the first location in the environment.

16. The one or more non-transitory computer-readable media as recited in claim 15, further storing computer-executable instructions that, when executed, cause the one or more processors to perform acts comprising:
- receiving audio data from at least one of the second device or a third device in the environment, the audio data representing user speech comprising a request associated with the first device; and
- analyzing the audio data to identify the request;
- and wherein the generating the computer-executable configuration data comprises generating, based at least in part on identifying the request, the computer-executable configuration data that, when executed by one or more processors of the first device, causes the first device to move the physical member to the updated position.

17. The one or more non-transitory computer-readable media as recited in claim 15, further storing computer-executable instructions that, when executed, cause the one or more processors to perform acts comprising:
- receiving audio data from at least one of the second device or a third device in the environment, the audio data representing user speech comprising a request associated with the first device and including identification data associated with the first device; and
- analyzing the audio data to identify the request and the identification data.

18. The one or more non-transitory computer-readable media as recited in claim 15, further storing computer-executable instructions that, when executed, cause the one or more processors to perform acts comprising:
- receiving, from at least one of the second device or a third device in the environment, identification data that identifies at least one of the first device or the second device;
- determining, using the identification data, an account associated with at least one of the first device or the second device; and determining, from the account, at least one characteristic associated with the environment;
- and wherein the generating comprises generating the computer-executable configuration data based at least in part on the at least one characteristic.

19. The one or more non-transitory computer-readable media as recited in claim 15, further storing computer-executable instructions that, when executed, cause the one or more processors to perform acts comprising:
- receiving audio data from the second device, the audio data representing user speech comprising a request to pair the second device with the first device;
- analyzing the audio data to identify the request to pair the second device with the first device; and
- sending, to the second device, an instruction to cause the second device to detect the first device using a wireless network interface of the second device.

20. The one or more non-transitory computer-readable media as recited in claim 15, wherein the computer-executable configuration data comprises first computer-executable configuration data and further storing computer-executable instructions that, when executed, cause the one or more processors to perform acts comprising:
- receiving, from at least one of the second device or a third device in the environment, second computer-executable configuration data indicative of a current configuration associated with the environment; and
- wherein the generating the first computer-executable configuration data comprises generating the first computer-executable configuration data based at least in part on the second computer-executable configuration data.

* * * * *